United States Patent
Oberhauser et al.

(10) Patent No.: US 10,454,927 B2
(45) Date of Patent: Oct. 22, 2019

(54) SYSTEMS AND METHODS FOR MANAGING RELATIONSHIPS AMONG DIGITAL IDENTITIES

(71) Applicant: Cambridge Blockchain, Inc., Cambridge, MA (US)

(72) Inventors: Alex Oberhauser, Medford, MA (US); Matthew Commons, Cambridge, MA (US); Ling Cheung Hughes, Cambridge, MA (US)

(73) Assignee: Cambridge Blockchain, Inc., Cambridge, MA (US)

( * ) Notice: Subject to any disclaimer, the term of this patent is extended or adjusted under 35 U.S.C. 154(b) by 0 days.

(21) Appl. No.: 16/364,125

(22) Filed: Mar. 25, 2019

(65) Prior Publication Data

US 2019/0222575 A1   Jul. 18, 2019

Related U.S. Application Data

(63) Continuation of application No. PCT/US2018/055335, filed on Oct. 11, 2018.

(60) Provisional application No. 62/571,241, filed on Oct. 11, 2017.

(51) Int. Cl.
*H04L 29/06* (2006.01)
*G07C 9/00* (2006.01)

(52) U.S. Cl.
CPC ...... *H04L 63/0869* (2013.01); *G07C 9/00134* (2013.01); *H04L 63/0884* (2013.01)

(58) Field of Classification Search
CPC ............ H04L 63/0869; H04L 63/0884; G07C 9/00134
See application file for complete search history.

(56) References Cited

U.S. PATENT DOCUMENTS

| | | | |
|---|---|---|---|
| 9,635,000 B1 * | 4/2017 | Muftic | ............... H04L 63/0435 |
| 2003/0149781 A1 * | 8/2003 | Yared | ..................... G06F 21/41 |
| | | | 709/229 |
| 2004/0162786 A1 * | 8/2004 | Cross | ..................... G06F 21/33 |
| | | | 705/59 |

(Continued)

OTHER PUBLICATIONS

Di Francesco Maesa D. et al., "Blockchain Based Access Control." In: Chen L., Reiser H. (eds) Distributed Applications and Interoperable Systems. DAIS 2017. Lecture Notes in Computer Science, vol. 10320. Springer, Cham, 14 pages. (Year: 2017).*

(Continued)

*Primary Examiner* — Michael Pyzocha
(74) *Attorney, Agent, or Firm* — Wolf, Greenfield & Sacks, P.C.

(57) ABSTRACT

Methods and apparatus for performing access control for a first entity. The method comprises using a pointer associated with a second entity to access, from a distributed ledger system, at least one attestation for at least one attribute of the second entity, wherein the at least one attestation is movable between at least two states in the distributed ledger system, the at least two states comprising a VERIFIED state and allowing the second entity to access the first entity in response to determining that the at least one attestation is in the VERIFIED state, that the third entity is to be trusted for verifying the at least one attestation, that the cryptographic proof is a valid proof of the at least one privilege label, and that the one or more access rules are satisfied.

27 Claims, 13 Drawing Sheets

(56) References Cited

U.S. PATENT DOCUMENTS

| | | | |
|---|---|---|---|
| 2009/0313129 A1* | 12/2009 | Rothschild | G06Q 20/04 705/17 |
| 2016/0098723 A1 | 4/2016 | Feeney | |
| 2016/0283920 A1* | 9/2016 | Fisher | H04L 9/3239 |
| 2016/0330027 A1* | 11/2016 | Ebrahimi | H04L 9/3066 |
| 2016/0344737 A1 | 11/2016 | Anton et al. | |
| 2017/0091397 A1* | 3/2017 | Shah | H04L 9/3236 |
| 2017/0103472 A1* | 4/2017 | Shah | G06N 5/02 |
| 2017/0111175 A1 | 4/2017 | Oberhauser et al. | |
| 2017/0177855 A1 | 6/2017 | Costa Faidella et al. | |
| 2018/0343120 A1* | 11/2018 | Andrade | H04L 9/3231 |
| 2019/0081796 A1* | 3/2019 | Chow | H04L 9/3247 |
| 2019/0092279 A1* | 3/2019 | Jarvis | B60R 25/24 |
| 2019/0095835 A1* | 3/2019 | Jarvis | G06Q 10/06 |

OTHER PUBLICATIONS

Nabi, Atif Ghulam, "Comparative Study on Identity Management Methods Using Blockchain", University of Zurich, Sep. 29, 2017, 118 total pages. (Year: 2017).*

Cresitello-Dittmar, Ben, "Application of the Blockchain for Authentication and Verification of Identity", Nov. 30, 2016, 9 pages. (Year: 2016).*

International Search Report and Written Opinion dated Jan. 7, 2019 for International Application No. PCT/US18/55335.

[No Author Listed], DIF Identity Hubs. 10 pages. https://github.com/decentralized-identity/identity-hub/blob/master/explainer.md [last retrieved Dec. 21, 2018].

[No Author Listed], Identity Blockchain Proof of Concept. Jun. 3, 2016. 3 pages. https://sbo.tech/blog/tech-blog-1/post/identity-blockchain-proof-of-concept-3 [last retrieved Oct. 23, 2018].

[No Author Listed], Identity.com Verifiable Credential Library. 12 pages. https://github.com/identity-com/credential-commons/blob/master/README.md [last retrieved Dec. 21, 2018].

[No Author Listed], One Small Step for the Web . . . Oct. 23, 2018. 21 pages. https://www.inrupt.com/blog/one-small-step-for-the-web [retrieved Oct. 25, 2018].

Andrieu et al., Verifiable Claims Use Cases. W3C Working Group Note. Jun. 8, 2017. 17 pages. https://www.w3.org/TR/verifiable-claims-use-cases [last retrieved Dec. 21, 2018].

Berners-Lee et al., Semantic Web Tutorial Using N3. May 20, 2003. 35 pages.

Demos et al., Banks Have a Solution for Their Identity—Fraud Woes: The DMV. The Wall Street Journal. Nov. 12, 2018. 3 pages. https://www.wsj.com/articles/banks-have-a-solution-for-their-identity-fraud-woes-the-dmv-1542018600?mod=hp_lead_pos7 [last retrieved Nov. 12, 2018].

Duffy, The Top Blockchain Patents of 2018. Law360. Jan. 7, 2019. 4 pages. https://www.law360.com/articles/1115575/print?section=ip [last retrieved Jan. 15, 2019].

Longley et al., Linked Data Proofs 1.0. Draft Community Group Report. Nov. 1, 2018. 14 pages. https://w3c-dvcg.github.io/ld-proofs [last retrieved Feb. 17, 2019].

Oberhauser, A Distributed Computation Engine for Reproducible, Verifiable, Reusable and Transparent Computations. Thesis submitted in partial fulfillment for the degree of Master of Science. Vrije Universiteit Amsterdam. Jan. 2016. 63 pages.

Sporny et al., Verifiable Claims Data Model and Representations. W3C First Public Working Draft. Aug. 3, 2017. 34 pages. http://www.w3.org/TR/verifiable-claims-data-model [last retrieved Dec. 21, 2018].

Sporny et al., Verifiable Credentials Data Model 1.0. Expressing verifiable information on the Web. W3C Editor's Draft. Jan. 22, 2019. 83 pages. https://w3c.github.io/vc-data-model [last retrieved Jan. 22, 2019].

* cited by examiner

FIG. 12
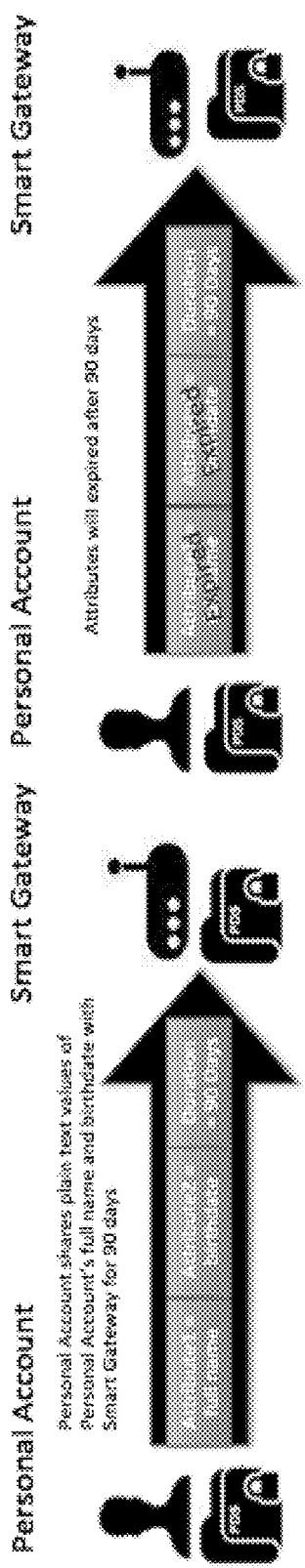
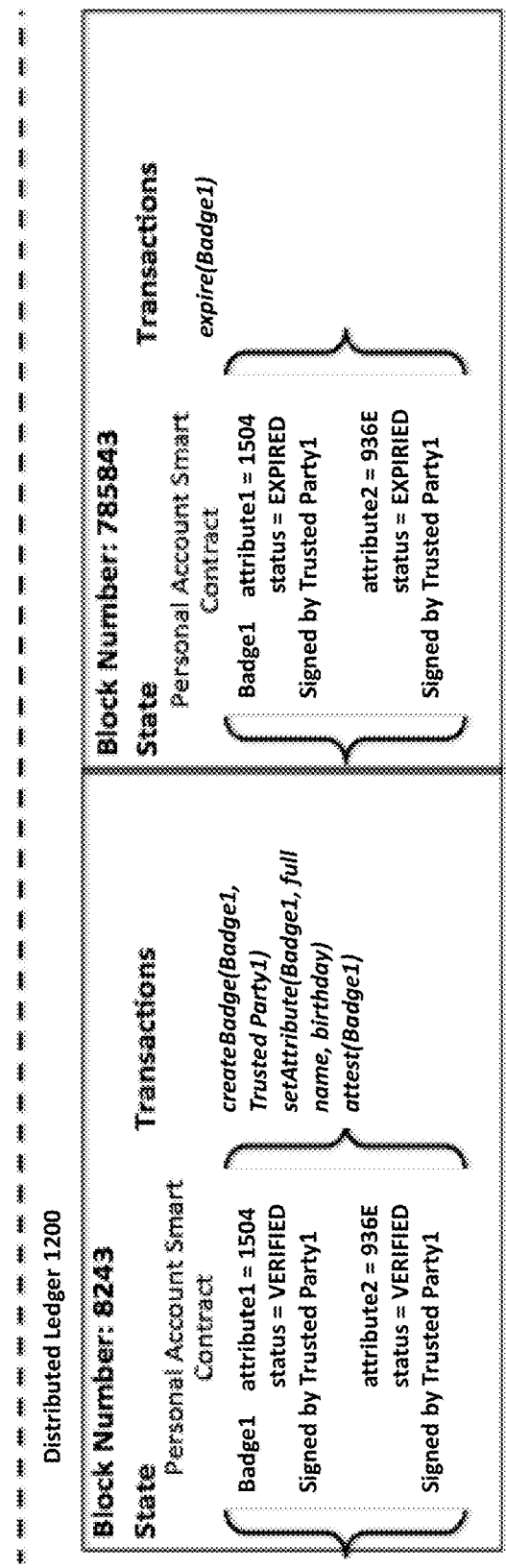

SYSTEMS AND METHODS FOR MANAGING RELATIONSHIPS AMONG DIGITAL IDENTITIES

RELATED APPLICATIONS

This Application is a Continuation of International Patent Application Serial No. PCT/US2018/055335, filed Oct. 11, 2018, entitled "SYSTEMS AND METHODS FOR MANAGING RELATIONSHIPS AMONG DIGITAL IDENTITIES," which claims priority under 35 U.S.C. § 119(e) to U.S. Provisional Application Ser. No. 62/571,241, filed Oct. 11, 2017, entitled "SYSTEMS AND METHODS FOR MANAGING DIGITAL IDENTITIES". The entire contents of each of these applications are incorporated herein by reference.

BACKGROUND

Organizations of all types (e.g., government agencies, healthcare institutions, financial institutions, retailers, social networking service providers, manufacturers, etc.) face security challenges with respect to physical and/or digital access. For instance, critical equipment of an organization may be located in a certain physical space, and the organization may limit access to that physical space to a small group of authorized persons (e.g., employees who have undergone background checks and/or other vetting procedures). Likewise, an organization may limit access to sensitive data to persons who need to handle the sensitive data.

In some instances, organizations may maintain records of physical and/or digital accesses. For instance, a record of which persons entered a restricted area, and when, may be useful for investigative purposes if a valuable object in the restricted area goes missing. Likewise, if a trade secret or other confidential information is leaked, it may be useful to have a record of who viewed or copied certain digital files.

Moreover, organizations may track persons and/or objects. As an example, movement of persons within a physical space (e.g., a building) may be tracked in real time to prevent unauthorized accesses. As another example, components and/or materials that go into making a finished product may be tracked for audit purposes.

SUMMARY

In some embodiments, a computer-implemented method for performing access control for a first entity is provided. The method comprises acts of: using a pointer associated with a second entity to access, from a distributed ledger system, at least one attestation for at least one attribute of the second entity, wherein the at least one attestation is movable between at least two states in the distributed ledger system, the at least two states comprising a VERIFIED state; determining whether the at least one attestation is in the VERIFIED state; determining whether to trust a third entity indicated as being responsible for verifying the at least one attestation; determining whether a cryptographic proof in the at least one attestation is a valid proof of at least one value of the at least one attribute of the second entity, wherein the at least one value of the at least one attribute comprises at least one privilege label of the second entity; determining whether one or more access rules of the first entity are satisfied, at least in part by applying at least one access rule of the one or more access rules to the at least one privilege label; and allowing the second entity to access the first entity in response to determining that the at least one attestation is in the VERIFIED state, that the third entity is to be trusted for verifying the at least one attestation, that the cryptographic proof is a valid proof of the at least one privilege label, and that the one or more access rules are satisfied.

In some embodiments, a computer-implemented method for performing attestation verification for a first entity is provided, the method comprising acts of: receiving, via a distributed ledger system, a request to verify at least one attestation corresponding to at least one attribute of a second entity, wherein: the at least one attestation comprises a cryptographic proof, the first entity is indicated as being responsible for verifying the at least one attestation, and the at least one attestation is movable between at least two states in the distributed ledger system, the at least two states comprising a VERIFIED state. The method further comprising receiving, via a channel outside the distributed ledger system, at least one value for the at least one attribute of the second entity, wherein: the at least one value comprises an identifier of a third entity, and storing the identifier of the third entity in the at least one attribute of the second entity indicates that the second entity bears a selected relationship with the third entity. The method further comprising determining whether the cryptographic proof in the at least one attestation is a valid proof of the received at least one value for the at least one attribute; determining whether the second entity bears the selected relationship with the third entity; and in response to determining that the cryptographic proof is a valid proof of the received at least one value and the second entity bears the selected relationship with the third entity: electronically signing the at least one attestation; and causing, via the distributed ledger system, the at least one attestation to be in the VERIFIED state.

In accordance with some embodiments, a system is provided, comprising at least one computer processor and at least one computer-readable storage medium having stored thereon instructions which, when executed, program the at least one computer processor to perform any of the above methods.

In accordance with some embodiments, at least one computer-readable storage medium having stored thereon instructions which, when executed, program at least one processor to perform any of the above methods.

BRIEF DESCRIPTION OF DRAWINGS

FIG. 12 shows another illustrative distributed ledger 1200, in accordance with some embodiments.

DETAILED DESCRIPTION

Figure 1:
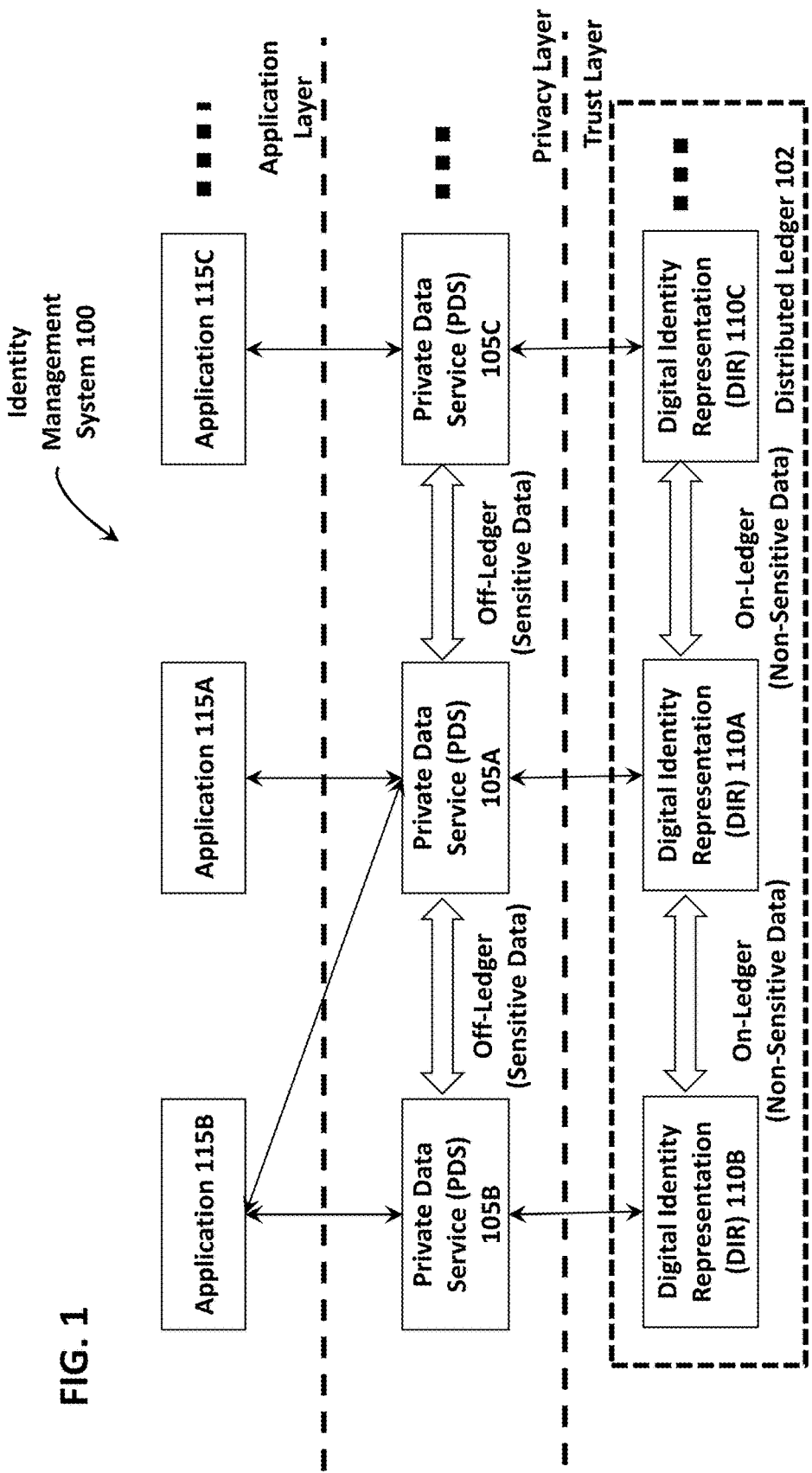
FIG. 1 shows an illustrative identity management system 100, in accordance with some embodiments.

Aspects of the present disclosure relate to systems and methods for managing relationships among digital identities.

U.S. patent application Ser. No. 15/294,643, titled "Systems and Methods for Managing Digital Identities," published on Apr. 20, 2017 as U.S. Patent Application Publication No. 2017/0111175 A1, issued on May 30, 2017 as U.S. Pat. No. 9,667,427, is hereby incorporated by reference in its entirety, and is referred to herein as the '643 application. U.S. patent application Ser. No. 15/950,732, titled "Systems and Methods for Managing Digital Identities," published on Aug. 16, 2018 as U.S. Patent Application Publication No. 2008/0234433 A1, is hereby incorporated by reference in its entirety, and is referred to herein as the '732 application.

The '643 and '732 applications describe an identity management system in which each identity owner may have a personal data service (PDS) storing sensitive data (e.g., one or more attribute values associated with the identity owner), as well as a corresponding Digital Identity Representation (DIR) in a distributed ledger. The DIR may be a smart contract that stores non-sensitive data, such as one or more badges for the identity owner. A badge may include one or more attribute attestations. An attribute attestation may include a cryptographic proof of an attribute value stored in the identity owner's PDS.

PDSes of different identity owners may communicate with each other. As one example, a PDS of a user may send attribute values (e.g., date of birth) via a secure channel to a PDS of a trusted entity, and may request that the trusted entity verify and attest to the attribute values, for instance, by reviewing physical documents (e.g., the user's passport) and electronically signing a badge comprising cryptographic proofs of the attribute values. As another example, a PDS of a user may send attribute values via a secure channel to a PDS of a counterparty, and the counterparty may check that the attribute values have been attested to by a trusted entity.

The inventors have recognized and appreciated that one or more of the techniques described in the '643 and '732 applications may be used to manage identities of identifiable objects, in addition to, or instead of, identities of users and organizations. Examples of identifiable objects include, but are not limited to, a network-enabled device (which may be identified by a network address, a device identifier, a device fingerprint, etc.), a component (which may be identified by a supplier identifier and a serial number), a piece of material (which may be identified by a supplier identifier and a lot number), etc.

For instance, in some embodiments, a PDS and a corresponding DIR may be provided for an identifiable object.[1] The PDS may store sensitive data associated with the identifiable object, such as public and/or private keys associated with the identifiable object, data collected by the identifiable object (e.g., by one or more sensors of the identifiable object), etc. The DIR may include software code implementing rules governing attribute attestation and/or other types of management for the identifiable object.

[1] Since an identity owner may, in some instances, be an inanimate object (e.g., a computing device), a PDS is sometimes referred to herein as a "private" data service, instead of a "personal" data service.

In some embodiments, a PDS and a corresponding DIR may be provided directly for an identifiable object. For instance, the identifiable object may be a mobile device hosting the PDS and the corresponding DIR. Additionally, or alternatively, the PDS and the corresponding DIR may be provided indirectly (e.g., via a related identifiable object). For instance, the identifiable object may be an Internet of Things (IoT) device, and the PDS and the corresponding DIR may be provided via a hub or a gateway with which the IoT device is adapted to communicate.

The inventors have further recognized and appreciated that one or more of the techniques described in the '643 and '732 applications may be used to manage identities of physical spaces, in addition to, or instead of, identities of users, organizations, and identifiable objects. Examples of physical spaces include, but are not limited to, a corporate campus, a building, a floor, a room, etc.

In some embodiments, a PDS and a corresponding DIR may be provided for a physical space. The PDS may store data associated with the physical space, such as public and/or private keys associated with the physical space, a name, a building/floor/room number, a mailing address, a set of global positioning system (GPS) coordinates, a blueprint, one or more rules governing access to the physical space, etc. Some or all of the data may be stored as attribute values, and may have attestations in the corresponding DIR. However, it should be appreciated that aspects of the present disclosure are not limited to storing any particular type of data in the PDS. For instance, in some embodiments, one or more access rules may be stored in the corresponding DIR, in addition to, or instead of, the PDS.

In some embodiments, a PDS and a corresponding DIR for a physical space may be provided on an access control device, such as a biometric lock (e.g., based on fingerprint, iris, and/or facial recognition). In some embodiments, the access control device may communicate with a separate device hosting the PDS and the corresponding DIR. Upon receiving an access request from a user, the access control device may use the PDS and the corresponding DIR to determine whether to allow the user to enter the physical space.

The inventors have further recognized and appreciated that a relationship between a first entity and a second entity may be expressed using one or more attributes in an identity management system. For instance, in some embodiments, an identifier for a first entity (e.g., an identifier of a PDS of the first entity) may be stored in an attribute in a PDS of a second entity to indicate that the first entity is subordinate to the second entity. As one example, a "belongsTo" attribute may be provided in a PDS of a device, and may store an identifier of a PDS of an entity to indicate that the entity owns the device. The entity may be a user or an organization. As another example, a "belongsTo" attribute may be provided in a PDS of a user, and may store an identifier of a PDS of an organization to indicate that the user is an employee of the organization. As yet another example, a PDS may be provided for an element in an organizational chart, and a "belongsTo" attribute in the PDS may store an identifier of a PDS of a parent element in the organizational chart.

However, it should be appreciated that aspects of the present disclosure are not limited to subordinate relationships. In some embodiments, an identifier for a first entity (e.g., an identifier of a PDS of the first entity) may be stored in an attribute in a PDS of a second entity to indicate that the first entity is superior to the second entity. In some embodiments, an identifier for a first entity (e.g., an identifier of a PDS of the first entity) may be stored in an attribute in a PDS of a second entity to indicate that the first entity is related to the second entity in a manner that is neither subordinate nor superior. For instance, a PDS may be provided for a first device, and a "connectedTo" attribute in the PDS may store an identifier of a PDS of a second device that is connected to the first device using any suitable networking technology (e.g., Bluetooth, WiFi, LoRaWAN, etc.). However, it should be appreciated that aspects of the present disclosure are not limited to modeling "connectedTo" explicitly using an attribute.

In some embodiments, a "locatedAt" attribute may be provided in a PDS of an identifiable object, and may store an identifier of a PDS of a physical space to indicate that the identifiable object is located at the physical space. Likewise, such a "locatedAt" attribute may be provided in a PDS of a user (or organization) to indicate that the user (or organization) is located at the physical space.

The inventors have further recognized and appreciated that an access privilege of an entity may be indicated using an attribute in an identity management system. For instance, in some embodiments, one or more privilege labels may be stored in an attribute in a PDS of a first entity. As an example, a privilege label may be used according to a selected access control scheme, such as "green" for unlimited access to all areas in a facility, "yellow" for general access except certain to restricted areas, and "red" for limited access to designated areas only. As another example, a privilege label may identify a second entity (e.g., a certain physical space or a certain identifiable object) to which the first entity has access. For instance, the privilege label may be a distributed ledger address for a DIR associated with the second entity.

In some embodiments, an access policy to be enforced by an entity may be indicated using an attribute in an identity management system. For instance, one or more policy labels may be stored in an attribute in a PDS of a first entity. Such a policy label may have one or more associated rules to be applied to determine whether access should be granted to a second entity, for example, based on one or more privilege labels asserted by the second entity.

The inventors have recognized and appreciated that different types of access policies may be enforced by an entity. In some embodiments, an "owner" policy may be provided to indicate complete access to all data and functionalities, including an ability to grant access to another entity. For example, an identifier of a PDS of an entity (e.g., a cryptographic key associated with the entity) may be stored, as a policy label, in an "owner" attribute in a PDS of a device to indicate that the entity has full control over the device. In some instances, identifiers for multiple entities may be stored in an "owner" attribute, such as an identifier for a user who owns the device, as well as an identifier for a controlling device (e.g., a smart gateway).

Additionally, or alternatively, a "guest" policy may be provided to indicate limited access to some data and/or functionalities. For example, an identifier of a PDS of an entity (e.g., a cryptographic key associated with the entity) may be stored, as a policy label, in a "guest" attribute in a PDS of a device. The entity may be a user, an organization or another device. Such "guest" status may allow the entity to access any suitable subset of data and/or functionalities indicated by an entity granting the "guest" status. In some instances, identifiers for multiple entities may be stored in a "guest" attribute, such as identifiers for multiple users.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

FIG. 1 shows an illustrative identity management system 100, in accordance with some embodiments. In this example, the identity management system 100 includes an identity management protocol stack having three layers. For instance, there may be a trust layer having a distributed ledger 102 for storing attestations (e.g., identity attestations, access privilege attestations, etc.). Additionally, or alternatively, there may be a privacy layer comprising a plurality of Private Data Services (PDSes) 105A, 105B, 105C, . . . , and/or an application layer comprising a plurality of applications 115A, 115B, 115C, . . . . The PDSes may store sensitive data of respective entities who engage in transactions via the applications (e.g., opening an account, making a purchase, accessing data, etc.).

In some embodiments, a PDS may include a software program for managing personally identifiable information (PII) and/or other sensitive data. For instance, a PDS may be implemented as a virtual container that wraps the software program in a file system to allow the software program to run consistently in any environment. For instance, the file system may include a runtime system, one or more system tools, one or more system libraries, etc. However, it should be appreciated that aspects of the present disclosure are not so limited. Alternatively, or additionally, a PDS may simply include a software program for managing sensitive data, without an accompanying file system.

In some embodiments, a PDS may be associated with a digital identity representation (DIR) in the distributed ledger 102. For instance, the PDSes 105A, 105B, 105C, . . . may be associated with DIRs 110A, 110B, 110C, . . . , respectively. In some embodiments, each individual identity owner may control a PDS and a corresponding DIR. The PDS may store sensitive data (e.g., items of PII, sensor data, and/or privilege labels), whereas the corresponding DIR may store non-sensitive data (e.g., cryptographic proofs of items of PII, cryptographic proofs of sensor data with or without timestamp, and/or cryptographic proofs of privilege labels). The PDSes may communicate with each other and share sensitive data in a secure manner, whereas the DIRs may record non-sensitive data in the distributed ledger 102.

In some embodiments, cryptographic proofs may be derived in a known manner from items of sensitive data, and may be signed by trusted entities which verified veracity of the items of sensitive data. A counterparty with which an entity has shared an item of sensitive data (e.g., a social security number, or an image of a serial number of a component) may readily check that an alleged cryptographic proof was indeed derived from the item of sensitive data, and that the cryptographic proof was indeed signed by a trusted entity (e.g., a government agency, or a manufacturer). However, it may be computationally infeasible for another entity to reconstruct the item of sensitive data from the cryptographic proof alone. In this manner, competing objectives of privacy and transparency may be achieved simultaneously.

In some embodiments, the distributed ledger 102 may include digital records replicated among a plurality of nodes in a peer-to-peer network. The nodes may carry out a synchronization protocol, whereby a change made at a node to a local copy of a digital record may be propagated through the network, and other nodes may update their respective copies of the same digital record accordingly.

In some embodiments, the distributed ledger may be implemented using a blockchain. The blockchain may include a plurality of blocks, where each block may include a plurality of transactions. In some embodiments, the plurality of transactions may be ordered, for example, chronologically. Additionally, or alternatively, the plurality of blocks may be ordered, where each newly added block may be linked to a latest previous block. In some embodiments, such a structure may be tamper-resistant, and may therefore be used to confirm whether a given transaction did take place, and/or when the transaction took place. For instance, a block may be added to the blockchain only if all nodes (or a subset of nodes with sufficient computation power) in a network implementing the blockchain agree on the block.

In some embodiments, a block generating node (sometimes called a miner) may invest computation power to generate a new block that is linked to a latest previous block. The fastest node that is able to solve a computationally intensive mathematical puzzle (e.g., identifying a preimage of a hash with a certain number of leading zeros) gets rewarded with an internal digital asset (e.g., a bitcoin). Depending on how much computation power is available in the network at a given point in time, a more or less complex mathematical puzzle may be used. In this manner, blocks may be generated in a selected time window, and conflicts may be reduced.

It should be appreciated that aspects of the present disclosure are not limited to the use of a proof-of-work approach such as the one described above. In some embodiments, a proof-of-stake approach may be used to achieve distributed consensus. It should also be appreciated that any suitable blockchain implementation may be used to provide a trust layer, including, but not limited to, Ethereum and Hyperledger Fabric. Furthermore, aspects of the present disclosure are not limited to using a blockchain to implement a distributed ledger. In some embodiments, one or more directed acyclic graphs (e.g. IOTA Tangle), hashgraphs (e.g. Swirlds), hash trees (e.g. Guardtime keyless signatures infrastructure), and/or distributed ledgers with no globally-shared chain (e.g. R3 Corda), may be used in addition to, or instead of, one or more blockchains.

Figure 2:
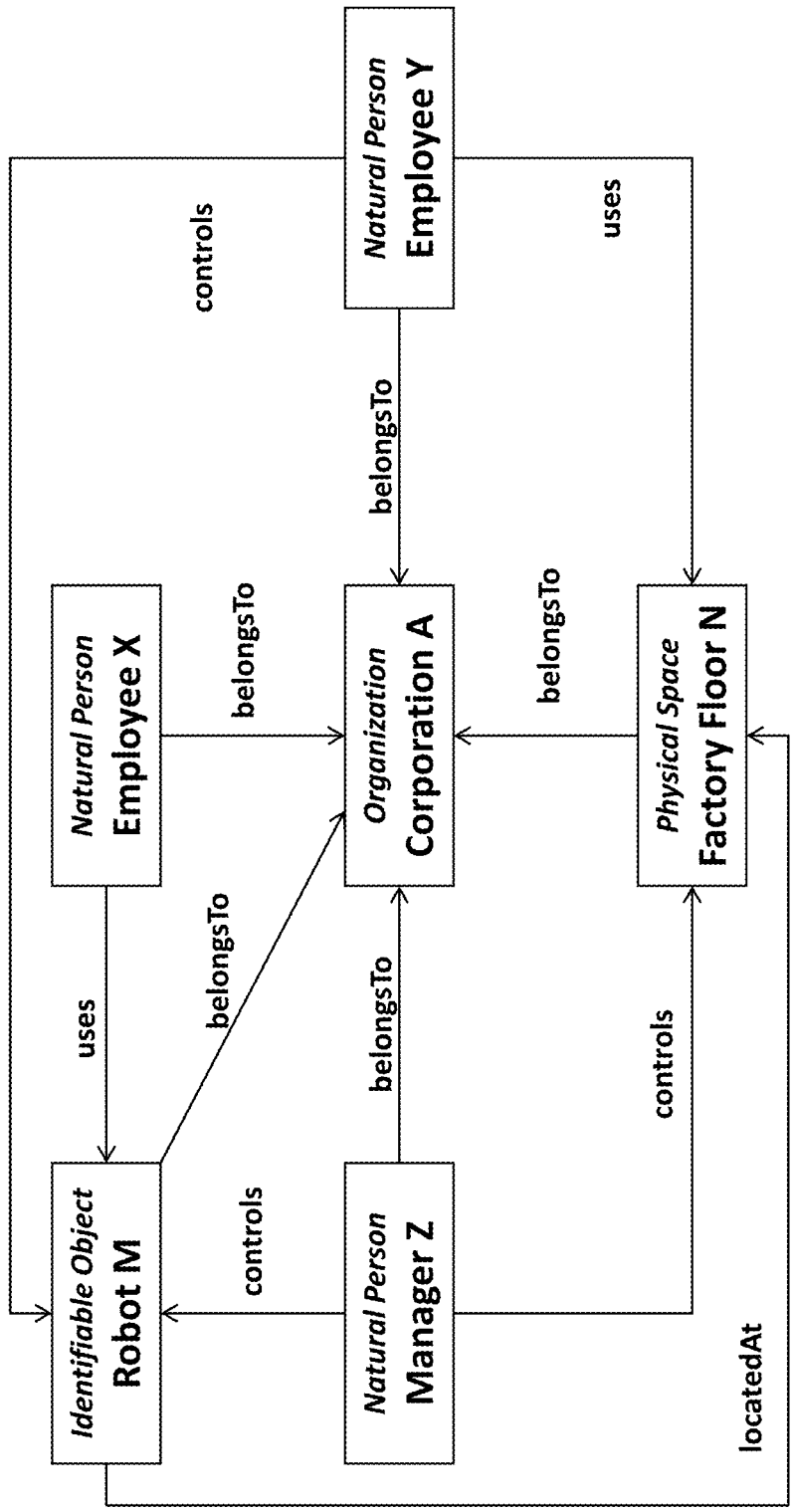
FIG. 2 shows an illustrative relationship chart 200, in accordance with some embodiments.

FIG. 2 shows an illustrative relationship chart 200, in accordance with some embodiments. In this example, the relationship chart 200 includes a plurality of entities, each of which may have a PDS and a corresponding DIR (e.g., as described above in connection with FIG. 1).

In some embodiments, different types of entities may be present in an identity management system. For instance, in the example of FIG. 2, the relationship chart 200 shows four types of entities, namely, Identifiable Object (e.g., Robot M), Natural Person (e.g., Employee X, Employee Y, and Manager Z), Organization (e.g., Corporation A), and Physical Space (e.g., Factory Floor N). However, it should be appreciated that aspects of the present disclosure are not limited to the use of any particular type of entity, or to classifying entities into different types.

The inventors have recognized and appreciated that a relationship between a first entity and a second entity may be expressed using one or more attributes in an identity management system. Below is an illustrative JSON-LD (JavaScript Object Notation for Linked Data) representation of attributes stored in a PDS of Corporation A in the example of FIG. 2, where an identifier for a holding corporation (not shown in FIG. 2) is stored in a "belongsTo" attribute to indicate that Corporation A belongs to the holding corporation, and an identifier for Corporation A's headquarters (not shown in FIG. 2) is stored in a "locatedAt" attribute to indicate that Corporation A is located at the headquarters.

```
{
  "@context": "https://example.org/platform-schema",
  "@id": "https://example.org/entities/corporation-A",
  "belongsTo": ["https://example.org/entities/holding-corporation"],
  "locatedAt": ["https://example.org/entities/headquarters-corporation-A"],
}
```

Likewise, an identifier for Corporation A may be stored in a "belongsTo" attribute to indicate that Employee Y belongs to Corporation A, and an identifier for Corporation A's factory in Boston (not shown in FIG. 2) may be stored in a "locatedAt" attribute to indicate that Employee Y works at the Boston factory. An illustrative JSON-LD representation of attributes stored in a PDS of Employee Y is shown below.

```
{
  "@context": "https://example.org/platform-schema",
  "@id": "https://example.org/entities/employee-Y",
  "belongsTo": ["https://example.org/entities/corporation-A"],
  "locatedAt": ["https://example.org/entities/factory-Boston"],
  "accessPrivileges": [{
    "@id": "https://example.org/privilege-labels/$LABEL_DEF_HASH/MEDIUM_SECURITY",
    "label": "MEDIUM_SECURITY",
    "createdAt": "2018-01-01T20:00:00Z"
  }, {
    "@id": "https://example.org/privilege-labels/$LABEL_DEF_HASH/AUTOMATION_CONFIG",
    "label": "AUTOMATION_CONFIG",
    "createdAt": "2018-01-01T20:00:00Z"
  }]
}
```

In this example, the PDS of Employee Y includes an attribute "accessPrivileges," which stores two privilege labels, "MEDIUM_SECURITY" and "AUTOMATION_CONFIG." The "MEDIUM_SECURITY" privilege label may indicate that Employee Y has undergone a basic background check, but does not have any government-issued security clearance. (By contrast, a "LOW_SECURITY" privilege label may indicate that an employee or visitor has not undergone any background check, and a "HIGH_SECURITY" privilege label may indicate that an employee or visitor has at least a selected level of government-issued security clearance.) The "AUTOMATION_CONFIG" privilege label may indicate that Employee Y is allowed to make changes to automation equipment. For instance, Employee Y may be a robotics engineer whose duties include testing and maintaining automation equipment. (By contrast, an "AUTOMATION_MONITOR" privilege label may indicate that an entity is allowed to view data collected by automation equipment, but is not allowed to make changes.) However, it should be appreciated that aspects of the present disclosure are not limited to the use of any particular privilege label or set of privilege labels.

Moreover, it should be appreciated that aspects of the present disclosure are not limited to the use of any particular attribute or set of attributes, or to any particular representation of attributes. A PDS may include any one or more of the attributes described herein, and/or one or more other attributes.

In the above example, a uniform resource location (URL) for a label (e.g., the privilege label "MEDIUM_SECURITY") includes a hash value referenced by $LABEL_DEF_HASH. This hash value may be generated by applying a selected cryptographic hash function to a definition of the label. This may allow detection of a modification to the definition of the label, for instance, by applying the same cryptographic hash function to a current definition of the label, and comparing a resulting hash value against the hash value in the URL. However, it should be appreciated that aspects of the present disclosure are not limited to using a hash value in a URL for a label.

In some embodiments, an access policy to be enforced by an entity may be indicated using an attribute in a PDS of the entity. Referring to the example shown in FIG. 2, a PDS of Robot M may have one or more attributes corresponding, respectively, to one or more different modes of access that may be granted to Robot M. An illustrative JSON-LD representation of attributes stored in the PDS of Robot M is shown below.

{
"@context": "https://example.org/platform-schema",
"@id": "https://example.org/entities/robot-M",
"belongsTo": ["https://example.org/entities/corporation-A"],
"locatedAt": ["https://example.org/entities/factory-floor-N"],
"usePolicies": [
  "https://example.org/privilege-labels/$LABEL_DEF_HASH/AUTOMATION_MONITOR",
  "https://example.org/privilege-labels/$LABEL_DEF_HASH/AUTOMATION_OPERATE"
],
"controlPolicies": [
  "https://example.org/privilege-labels/$LABEL_DEF_HASH/AUTOMATION_CONFIG",
  "https://example.org/privilege-labels/$LABEL_DEF_HASH/FLOOR_MANAGER"
]
} In this example, the PDS of Robot M has two attributes, "usePolicies" and "controlPolicies," corresponding, respectively, to two different access modes. An entity that has been granted access in a "use" mode may be allowed to pull data from Robot M (e.g., data collected by one or more sensors of Robot M, such as a camera, a barcode reader, etc.) and/or operate Robot M, but may not be allowed to make changes to Robot M (e.g., changes to one or more configuration settings). One or more rules for determining which actions are allowed in the "use" mode may be stored in association with Robot M. By contrast, an entity that has been granted access in a "control" mode may be allowed not only to use Robot M, but also to make changes to Robot M. One or more rules for determining which actions are allowed in the "control" mode may be stored in association with Robot M. In some instances, no rule may be provided, indicating that all actions are allowed in the "control" mode.

It should be appreciated that aspects of the present disclosure are not limited to any particular access mode or set of access modes. In some embodiments, only one access mode may be provided. In some embodiments, more than two access mode may be provided, for example, to allow different types of "use" access (e.g., different sets of functionalities, different categories of data, etc.) and/or different types of "control" access (e.g., different sets of configuration settings).

In the above example of Robot M, one or more privilege labels are stored in a policy attribute to indicate that an entity with at least one of the one or more privilege labels should be granted access under the corresponding access mode. For instance, privilege labels "AUTOMATION_MONITOR" and "AUTOMATION_OPERATE" are stored in the policy attribute "usePolicies" to indicate that an entity with at least one of the privilege labels "AUTOMATION_MONITOR" and "AUTOMATION_OPERATE" should be granted access under the "use" mode (provided that such a privilege label has been attested to by a trusted entity). Although individual privilege labels are used in this example, it should be appreciated that aspects of the present disclosure are not so limited. In some embodiments, any suitable logical combination of one or more privilege labels may be used (e.g., with logical operators such as AND, OR, NOT, etc.).

In some embodiments, one or more policy labels may be stored in a policy attribute, in addition to, or instead of, one or more privilege labels. Referring to the example shown in FIG. 2, one or more policy labels may be stored in an attribute in a PDS of Factory Floor N, and may be used by the PDS in determining whether to grant a request to access Factory Floor N. An illustrative JSON-LD representation of attributes stored in a PDS of Factory Floor N is shown below.

{
"@context": "https://example.org/platform-schema",
"@id": "https://example.org/entities/factory-floor-N",
"belongsTo": ["https://example.org/entities/corporation-A"],
"locatedAt": ["https://example.org/entities/factory-Boston"],
"usePolicies": [
  "https://example.org/policy-labels/GUEST",
  "https://example.org/policy-labels/EMPLOYEE"
],
"controlPolicies": [
  "https://example.org/policy-labels/MANAGEMENT",
  "https://example.org/policy-labels/ENGINEERING"
]
}
In this example, the PDS of Factory Floor N has two attributes, "usePolicies" and "controlPolicies," corresponding, respectively, to two different modes of access that may be granted to Factor Floor N. An entity that has been granted access in a "use" mode may be allowed to enter Factor Floor N, but may not be allowed to make changes to Factory Floor N (e.g., climate, lighting, power consumption, equipment scheduling, etc.). One or more rules for determining which actions are allowed in the "use" mode may be stored in association with Factory Floor N. By contrast, an entity that has been granted access in a "control" mode may be allowed not only to enter Factor Floor N, but also to make changes to Factory Floor N. One or more rules for determining which actions are allowed in the "control" mode may be stored in association with Factory Floor N. In some instances, no rule may be provided, indicating all actions are allowed in the "control" mode.

In some embodiments, a policy label stored in an attribute in a PDS of a first entity may have one or more associated rules to be applied to determine whether access to the first entity should be granted to a second entity, for example, based on one or more privilege labels asserted by the second entity. An illustrative JSON-LD representation of the policy label "MANAGEMENT" stored in the "controlPolicies" attribute of the PDS of Factory Floor N is shown below.
```
{
  "@context": "https://example.org/platform-schema",
  "@id": "https://example.org/policy-labels/MANAGE-
    MENT",
  "belongsTo": ["https://example.org/entities/corporation-
    A"],
  "createdAt": "2018-01-01T20:00:00Z",
  "modifiedAt": "2018-02-01T13:00:00Z",
  "hasRules": ["https://example.org/rules/management"]
}
```
In this example, a rule "management" is provided for the policy label "MANAGEMENT." Below is an illustrative implementation of the rule "management." However, it should be appreciated that aspects of the present disclosure are not limited to any particular rule or combination of rules, or any particular implementation of a rule. Moreover, the "management" rule below is written in a format that is merely illustrative. Any suitable rule format may be used, such as a Rule Interchange Format (RIF) established by the World Wide Web Consortium (W3C).
```
{
IF $ENTITY IS natural person
    AND     $ENTITY.belongsTo     INCLUDES
        [$MYSELF.belongsTo]
    AND $ENTITY.locatedAt INCLUDES [$ MYSEL-
        F.locatedAt]
    AND $ENTITY.accessPrivileges INCLUDES [
        "https://example.org/privilege-labels/$LA-
            BEL_DEF_HASH/FLOOR_MANAGER",
        "https://example.org/privilege-labels/$LA-
            BEL_DEF_HASH/OFFICE_MANAGER",
        "https://example.org/privilege-labels/$LA-
            BEL_DEF_HASH/DIRECTOR"
        ]
    AND $ENTITY.accessPrivileges INCLUDES [
        "https://example.org/privilege-labels/$LA-
            BEL_DEF_HASH/HIGH_SECUIRTY",
        "https://example.org/privilege-labels/$LA-
            BEL_DEF_HASH/MEDIUM_SECURITY"
        ]
    AND   $ENTITY.belongsTo   ATTESTED   BY
        SUPER_MANAGER
    AND   $ENTITY.locatedAt   ATTESTED   BY
        SUPER_MANAGER
    AND $ENTITY.accessPrivileges ATTESTED BY
        SUPER_MANAGER
    GRANT ACCESS
}
```
In this example, $ENTITY references an entity requesting access, and $TARGET references an entity to which access is requested. In some embodiments, the "management" rule may check that the entity requesting access is a natural person. This may improve security, for example, by preventing entities of other types to perform actions that only natural persons are allowed to perform.

In some embodiments, the "management" rule may check that a value of a "belongsTo" attribute of the entity requesting access matches a value of a "belongsTo" attribute of the entity to which access is requested. Likewise, the "management" rule may check that a value of a "locatedAt" attribute of the entity requesting access matches a value of a "locatedAt" attribute of the entity to which access is requested.

In some embodiments, a rule engine may be used to evaluate rules such as the "management" rule. The rule engine may be adapted to make one or more inferences. For instance, with reference to the above examples of Employ Y and Robot M, the rule engine may be adapted to infer that Employee Y's location matches Robot M's location because: (i) Employee Y is located at the Boston Factory, (ii) Robot M is located at Factory Floor N, and (iii) Factory Floor N is located at the Boston Factory. However, it should be appreciated that aspects of the present disclosure are not limited to the use of any particular rule engine, or any rule engine at all.

In some embodiments, the "management" rule may check that the entity requesting access has at least one privilege label corresponding to a position of floor manager, office manager, or director.

In some embodiments, the "management" rule may check that the entity requesting access has at least one privilege label corresponding to a medium or high level of security clearance.

In some embodiments, the "management" rule may check that the "belongsTo," "locatedAt," and "accessPrivileges" attribute values of the entity requesting access have been attested to by a trusted entity. For instance, "SUPER_MANAGER" may refer to a list of trusted entities stored in a DIR of Corporation A. In some embodiments, only natural persons may be on the list of trusted entities, such as a natural person who created Corporation A's entity, and/or a natural person designated by another natural person who is already on the list of trusted entities.

In some embodiments, access granted by the "management" rule may be context dependent. For instance, in the above example, the "management" rule is applied for the "control" mode of Factory Floor N. One or more rules associated with the "control" mode of Factory Floor N may indicate which one or more functionalities and/or pieces of data may be accessed.

Referring again to the example shown in FIG. 2, the "management" rule above may be applied by Factory Floor N to determine whether to allow Manager Z to make a change to Factory Floor N. An illustrative JSON-LD representation of attributes stored in a PDS of Manager Z is shown below.
```
{
  "@context": "https://example.org/platform-schema",
  "@id": "https://example.org/entities/manager-Z",
  "belongsTo": ["https://example.org/entities/corporation-
    A"],
  "locatedAt": ["https://example.org/entities/factory-Bos-
    ton"],
  "accessPrivileges": [{
    "@id":     "https://example.org/privilege-labels/$LA-
        BEL_DEF_HASH/HIGH_SECUIRTY",
    "label": "HIGH_SECURITY",
    "createdAt": "2018-01-01T20:00:00Z"
  }, {
    "@id":     "https://example.org/privilege-labels/$LA-
        BEL_DEF_HASH/FLOOR_MANAGER",
    "label": "FLOOR_MANAGER",
    "createdAt": "2018-01-01T20:00:00Z"
  }]
}
```
In some embodiments, the "management" rule may apply successfully to Factory Floor N and Manager Z, since Manager Z is a natural person, both entities belong to Corporation A, both entities are located at the Boston factory, Manager Z is a floor manager, and Manger Z has a high security clearance, provided the privilege labels of Manager Z have been properly attested to by a natural person on the SUPER_MANAGER list.

It should be appreciated that the "management" rule above is provided solely for purposes of illustration, as aspects of the present disclosure are not limited to any particular rule or combination of rules. For instance, a rule may be used that does not check that the entity requesting access and the entity to which access is requested belong to a same organization. In some embodiments, a rule may be provided that checks that the entity requesting access belongs to a selected organization different from the organization of the entity to which access is requested. For example, a policy label "https://example.org/policy-labels/GUEST_FROM_CORP_B" may be provided, with a rule that checks the following.

$ENTITY.belongsTo INCLUDES ["https://example.org/entities/corporation-B"]

In some embodiments, a cryptographic proof of an attribute value stored in an identity owner's PDS may be stored in a corresponding DIR, for example, in an attestation of the attribute value. Such attribute attestations in the DIR may, although need not, be stored in one or more badges for the identity owner. The DIR may be a smart contract programmed to implement rules for attribute attestation.

Figure 3:
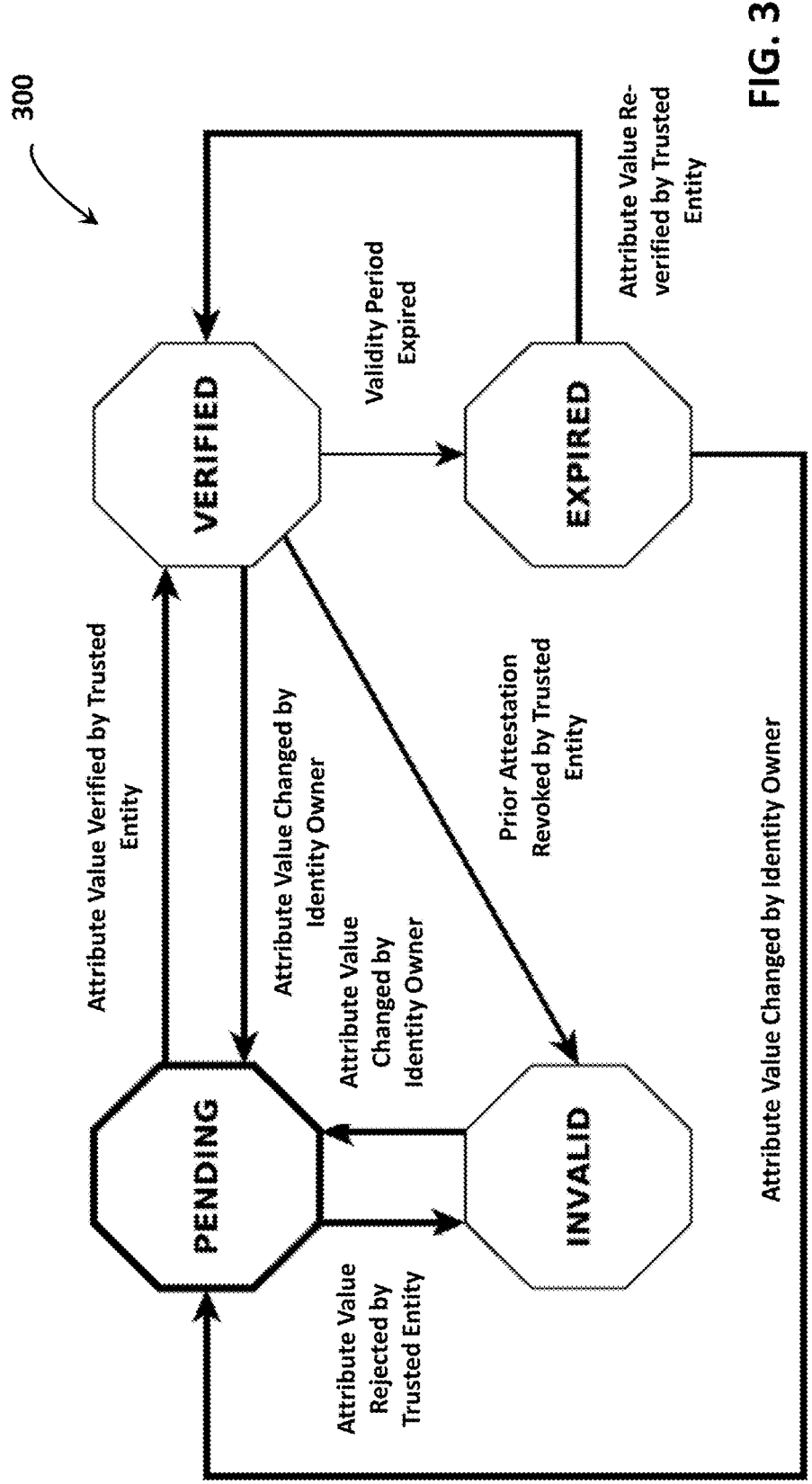
FIG. 3 shows an illustrative state machine 300 that governs transitions among different states of an attribute attestation, in accordance with some embodiments.

FIG. 3 shows an illustrative state machine 300 that governs transitions among different states of an attribute attestation, in accordance with some embodiments. For instance, the state machine 300 may govern state transitions of attribute attestations in a DIR corresponding to a PDS of an illustrative entity shown in FIG. 2.

In some embodiments, when a badge is created with an attribute attestation (or when an attribute attestation is added to an existing badge), the attribute attestation may be initialized to a PENDING state. In this state, the attribute attestation may be neither valid nor invalid.

In some embodiments, an identity owner for whom the badge is created may request that a trusted entity associated with the badge verify a value of the attribute. If the trusted entity verifies the value of the attribute, the trusted entity may cause the attribute attestation to be in a VERIFIED state. If the trusted entity rejects the value of the attribute, the trusted entity may cause the attribute attestation to be in an INVALID state.

In some embodiments, if the attribute attestation is in the VERIFIED state, the EXPIRED state, or the INVALID state, and the identity owner causes the attribute to have a different value, the attribute attestation may return to the PENDING state.

In some embodiments, if the attribute attestation is in the VERIFIED state, and the trusted entity revokes the previous attestation, the trusted entity may cause the attribute attestation to be in the INVALID state.

In some embodiments, if the attribute attestation is in the VERIFIED state, and an expiry period elapses, the attribute attestation may move into an EXPIRED state, where the attribute attestation may remain until the trusted entity re-verifies the value of the attribute.

It should be appreciated that the state machine 300 is shown in FIG. 3 and described above solely for purposes of illustration, as aspects of the present disclosure are not limited to any particular combination of states and/or state transitions.

Figure 4:
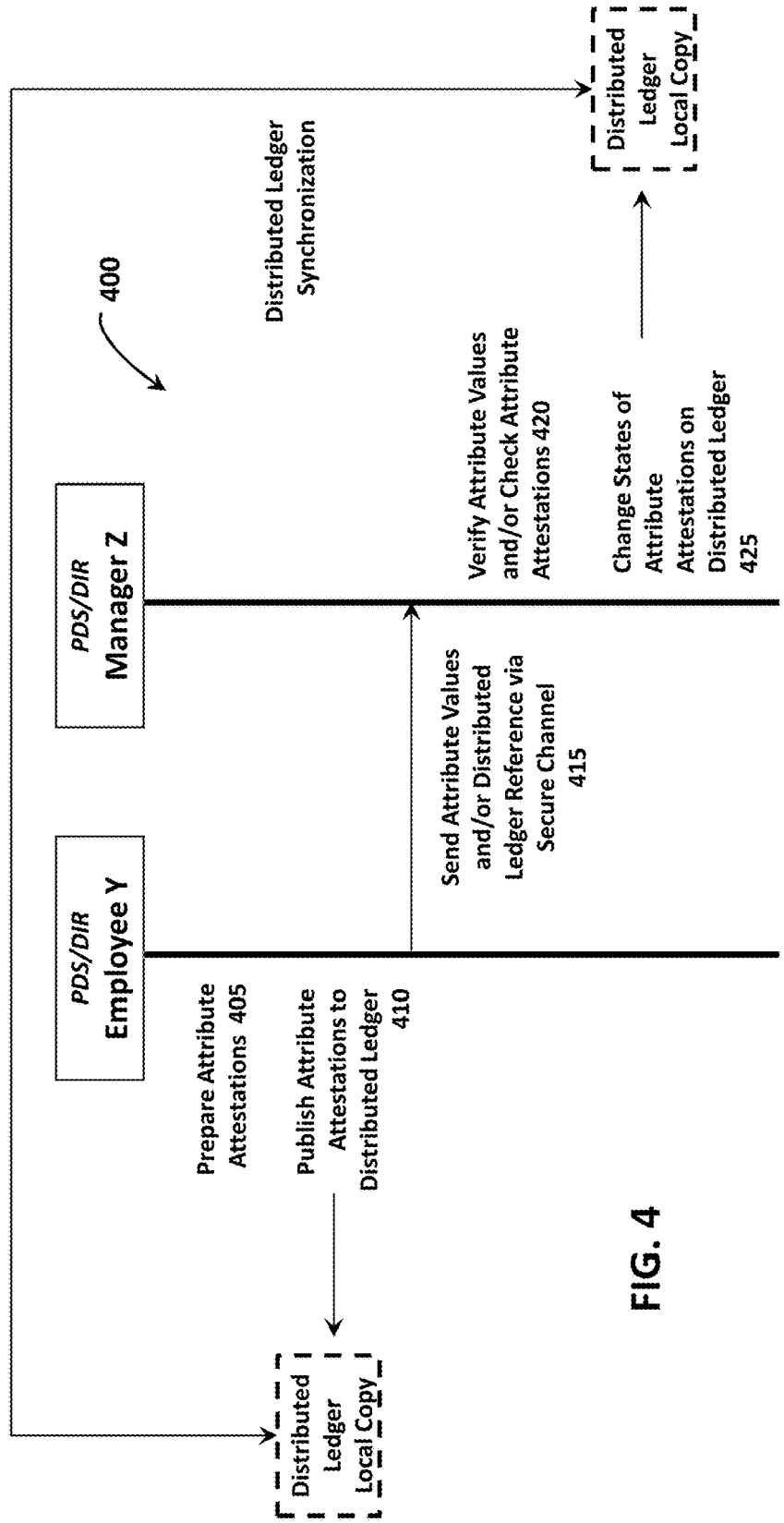
FIG. 4 shows an illustrative process 400 for attestation by a trusted entity, in accordance with some embodiments.

FIG. 4 shows an illustrative process 400 for attestation by a trusted entity, in accordance with some embodiments. For instance, the process 400 may be performed between Employee Y and Manager Z in the example of FIG. 2. In some embodiments, as part of an onboarding process, Employee Y may be provided with a device (e.g., smartphone, tablet, or laptop) on which a PDS and a corresponding DIR are already installed. Additionally, or alternatively, Employee Y may be instructed to download and install the PDS and the corresponding DIR onto Employee Y's own device. The PDS and the corresponding DIR may be initialized with appropriate attribute values based on Employee Y's position and/or job duties.

At act 405, Employee Y's PDS may prepare one or more attribute attestations. For instance, as discussed above in connection with FIG. 2, Employee Y's PDS may include attributes "belongsTo," "locatedAt," "usePolicies," and "controlPolicies." In some embodiments, the PDS may generate an attestation for each attribute (e.g., "belongsTo") by applying a cryptographic hash function to a value of the attribute (e.g., "https://example.org/entities/corporation-A") to obtain a cryptographic proof of the attribute value. Any suitable cryptographic hash function may be used, as aspects of the present disclosure are not so limited. Moreover, a cryptographic hash function may be applied in any suitable manner (e.g., with or without a randomly generated salt). The resulting attribute attestations may, although need not, be organized into a badge.

At act 410, Employee Y's PDS may cause the one or more attribute attestations to be published to a distributed ledger. For instance, in some embodiments, the PDS may request that the corresponding DIR publish the one or more attribute attestations along with suitable metadata (e.g., metadata identifying the cryptographic hash function used to generate the one or more attribute attestations).

At act 415, Employee Y's PDS may send one or more attribute values (e.g., "https://example.org/entities/corporation-A") to Manager Z's PDS via a secure channel that is outside the distributed ledger. Employee Y's PDS may also send relevant metadata, such as a salt value (if used to generate an attestation).

In some embodiments, Employee Y's PDS may send to Manager Z's PDS a reference to Employee Y's DIR, so that Manager Z's PDS may look up one or more attribute attestations from the distributed ledger, corresponding, respectively, to the one or more attribute values sent by Employee Y's PDS. Additionally, or alternatively, Employee Y's DIR may trigger an on-ledger event (e.g., a "Verification Request" event) to notify Manager Z's PDS.

At act 420, Manager Z may verify a received attribute value directly, for example, by verifying Employee Y's background check result, government-issued security clearance, title and job description on a company roster (e.g., whether Employee Y works for Corporation A at the Boston factory), etc.

Additionally, or alternatively, Manager Z may verify a received attribute value indirectly via a referenced attestation. For instance, for a given attribute attestation, Manager Z's PDS may check if Employee Y's PDS provided a reference to another attestation. If so, Manager Z's PDS may look up the other attestation from the distributed ledger, and may perform one or more checks. For instance, Manager Z's DIR may check that an entity that verified the other attestation is trustworthy (e.g., a government agency that issued Employee Y's security clearance), a cryptographic proof in the other attestation is generated from the received attribute value using an algorithm specified in the other attestation, the other attestation is in a VERIFIED state, and/or the other attestation is signed by the verifying entity. Any suitable electronic signature scheme may be used, as aspects of the present disclosure are not so limited.

In some embodiments, entities may form a trust structure, in which an entity may trust one or more other entities, and may rely upon attribute attestations signed by any of the one or more trusted entities. In this manner, an entity may be able to verify an attribute attestation without having to perform a physical verification.

Returning to act 420 of FIG. 4, Manager Z's PDS may, in some embodiments, check that a cryptographic proof in the attribute attestation is generated from the corresponding received attribute value using an algorithm specified in the attribute attestation.

In some embodiments, each received attribute value may be verified, and the corresponding attribute attestation may be checked. If no issue is found, Manager Z's PDS may, at act 425, cause a state of the attribute attestation to be changed to VERIFIED. Additionally, or alternatively, Manager Z's PDS may sign the attribute attestation using a cryptographic private key associated with Manager Z.

Although the process 400 is described above with reference to Employee Y and Manager Z in the example of FIG. 2, it should be appreciated that the process 400 may also be used in other contexts. For instance, in some embodiments, the process 400 may be performed between a PDS of an identifiable object and a PDS of a trusted entity, whereby the trusted entity verifies one or more attribute values for the identifiable object (e.g., whether the identifiable object belongs to a certain natural person or organization, or is located at a certain physical space).

Figure 5:
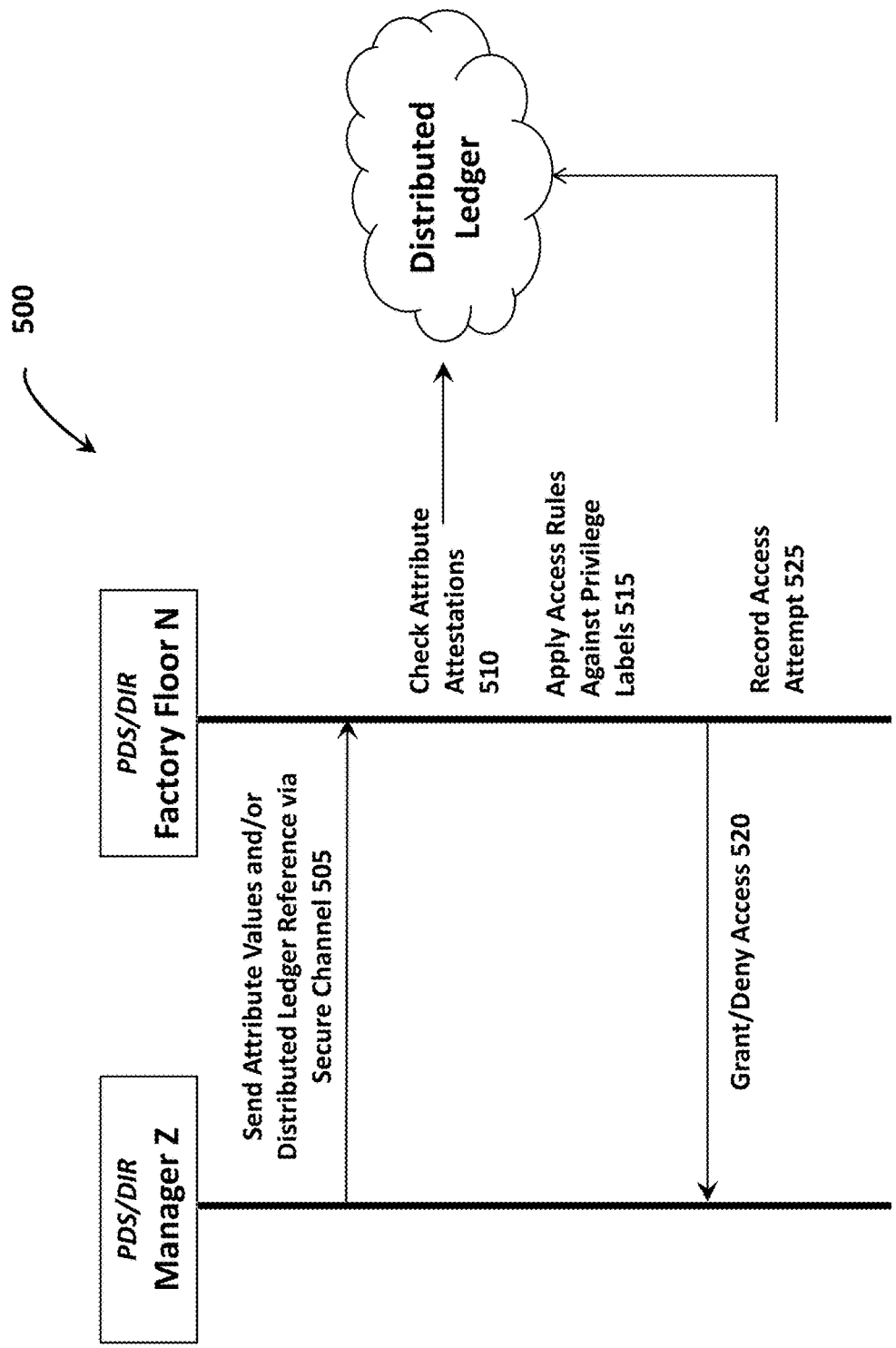
FIG. 5 shows an illustrative process 500 for access policy enforcement, in accordance with some embodiments.

FIG. 5 shows an illustrative process 500 for access policy enforcement, in accordance with some embodiments. For instance, the process 500 may be performed between Manager Z and Factor Floor N in the example of FIG. 2. In some embodiments, a controller at Factory Floor N (e.g., for controlling temperature, lighting, power consumption, equipment scheduling, etc.) may host Factory Floor N's PDS and corresponding DIR, or may communicate with a separate device hosting Factory Floor N's PDS and corresponding DIR. Upon receiving a request from Manager Z to change one or more settings, the controller may use the PDS and the corresponding DIR to determine whether to effectuate the one or more changes requested by Manager Z.

In some embodiments, the process 500 may be triggered when Manager Z begins an interaction with the controller. As one example, Manager Z may physically interact with the controller, for instance, by activating a touchscreen of the controller. As another example, Manager Z's device may send a request to the controller via one or more off-ledger channels, which may be established via an ad-hoc network (e.g., using Bluetooth or LoRaWAN), a local area network (e.g., using WiFi), and/or the Internet. The controller may, in some embodiments, use a result of the process 500 to determine which possible actions to expose to Manager Z, for instance, via the controller's touchscreen and/or a software interface rendered by Manager Z's device.

Additionally, or alternatively, the process 500 may be triggered when Manager Z attempts to perform an action via the controller. The controller may determine (e.g., based on a type of the requested action) whether interdiction is appropriate.

At act 505, Manager Z's PDS may send to Factory Floor N's PDS one or more attribute values. With reference to the example of FIG. 2, Manager Z's PDS may send any one or more of the following values.

"https://example.org/entities/manager-Z" for the attribute "@id"
"https://example.org/entities/corporation-A" for the attribute "belongsTo"
"https://example.org/entities/factory-Boston" for the attribute "locatedAt"

{"https://example.org/privilege-labels/$LABEL_DEF_HASH/HIGH_SECUIRTY",
"https://example.org/privilege-labels/$LABEL_DEF_HASH/FLOOR_MANAGER"} for the attribute "accessPrivileges"

Any one or more other attribute values may be sent in addition to, or instead of, the above values, as aspects of the present disclosure are not so limited. Manager Z's PDS may also send relevant metadata, such as a salt value (if used to generate an attestation).

Additionally, or alternatively, Manager Z's PDS may send to Factory Floor N's PDS a reference to one or more attestations on a distributed ledger. The one or more attestations may correspond, respectively, to the one or more attribute values sent by Manager Z's PDS. In some embodiments, the one or more attestations may be stored in a badge in Manager Z's DIR, and the reference to the one or more attestations may include a reference to the badge and/or a reference to Manager Z's DIR. In some embodiments, the reference to the one or more attestations may be stored after a first session between Manager Z's PDS and Factory Floor N's PDS, and may be used by Factory Floor N's PDS during a subsequent session.

At act 510, Factory Floor N's PDS may use the received reference to look up the one or more attribute attestations from the distributed ledger. Factory Floor N's PDS may then perform one or more checks. For instance, Factory Floor N's PDS may check that an entity that verified an attribute attestation is trustworthy, the attribute attestation is in a VERIFIED state, a cryptographic proof in the attribute attestation is generated using an algorithm specified in the attribute attestation (or a badge containing the attribute attestation) from a corresponding attribute value received from Manager Z's PDS, and/or the attribute attestation is signed by the verifying entity.

In some embodiments, Factory Floor N's PDS may determine whether an entity that verified an attribute attestation is trustworthy by looking up a list of trusted entities. For instance, Factory Floor N's DIR may maintain a list of trusted entities. Additionally, or alternatively, Factory Floor N's PDS may access a list of trusted entities from the distributed ledger (e.g., Corporation A's DIR).

In some embodiments, Manager Z's PDS may send identity-related attribute values (e.g., values for "@id," "belongsTo," "locatedAt," etc.) upon initializing an interaction with Factory Floor N's PDS. Factory Floor N's PDS may perform one or more checks as described above in connection with act 520. If the one or more checks are successful, Factory Floor N may expose a menu of possible actions to Manager Z. If a check is unsuccessful, Factory Floor N may decline to expose any action to Manager Z, or may expose a limited menu of possible actions.

In some embodiments, in response to Manager Z attempting to perform an action, Factory Floor N's PDS may determine one or more applicable access modes. As one example, if Manager Z attempts to view historical power consumption, Factory Floor N's PDS may determine that such an action may be performed under either the "use" mode or the "control" mode. Factory Floor N's PDS may request Manager Z's PDS to prove that at least one of the following four policies is met.

"https://example.org/policy-labels/GUEST"
"https://example.org/policy-labels/EMPLOYEE"
"https://example.org/policy-labels/MANAGEMENT"
"https://example.org/policy-labels/ENGINEERING"

As another example, if Manager Z attempts to change equipment scheduling, Factory Floor N's PDS may determine that such an action may only be performed under the "control" mode. Factory Floor N's PDS may ask Manager Z's PDS to prove that at least one of the following two policies is met.

"https://example.org/policy-labels/MANAGEMENT"
"https://example.org/policy-labels/ENGINEERING"

In some embodiments, Manager Z's PDS may determine, based on the identified policies, which one or more privilege labels to present to Factor Floor N's PDS. For instance, Manager Z's DIR may include a badge corresponding to the MANAGEMENT policy, and Manager Z's PDS may present that badge (e.g., by sending to Factor Floor N's PDS relevant privilege labels, metadata, and/or a reference to access the badge from the distributed ledger). In some embodiments, Manager Z's PDS may also send an indication of a policy to be applied to the privilege labels.

The inventors have recognized and appreciated that better privacy protection may be provided by allowing Manager Z's PDS to present only those privilege labels that are relevant. However, it should be appreciated that aspects of the present disclosure are not so limited. In some embodiments, Manager Z's PDS may present all privilege labels, and Factory Floor N's PDS may grant access in a least restrictive mode permitted by the privilege labels.

In some embodiments, Factory Floor N's PDS may perform one or more checks (e.g., as described above in connection with act 510) on the one or more attestations of the one or more privilege labels presented by Manager Z's PDS. If the one or more checks pass, Factory Floor N's PDS may, at act 515, apply one or more access rules associated with the policy indicated by Manager Z's PDS. For instance, Factory Floor N's PDS may apply the "management" rule described above to privilege labels presented by Manager Z. However, it should be appreciated that aspects of the present disclosure are not limited to using any particular rule or combination of rules.

At act 520, Factory Floor N's PDS may decide to grant or deny Manager Z's access request based on an outcome of act 515. At act 525, Factory Floor N's PDS may cause a record of the access attempt to be stored to the distributed ledger. Any suitable information may be stored in the record, such as date and time, identity of the entity that requested access, identity of the entity to which access was requested, an access policy that was applied, a rule that was violated (if access was denied), etc. In some embodiments, such a record may be stored if access is granted, for example, for audit purposes. Additionally, or alternatively, such a record may be stored if access is denied, for example, for investigative purposes.

Although the process 500 is described above with reference to Manager Z and Factory Floor N in the example of FIG. 2, it should be appreciated that the process 500 may also be used in other contexts. For instance, in some embodiments, the process 500 may be performed between a PDS of a first identifiable object and a PDS of a second identifiable object, whereby the first identifiable object requests access to a service provided by the second identifiable object (e.g., one or more pieces of data collected by the second identifiable object, one or more functionalities performed by the second identifiable object, etc.).

The inventors have recognized and appreciated that, in some embedded technology, there is a one-to-one relationship between a device and an application to which the device sends data. A user may not be able to control where the data is sent, or end a communication stream between the device and the application. The inventors have further recognized and appreciated that one or more of the identity management techniques described herein may be used to associate identities with smart devices, and/or implement one or more access control functionalities.

Accordingly, in some embodiments, an identity management system may be provided that gives authorized users control over where a device's data is sent, and/or which parties are allowed to communicate with the device. In this manner, if a device in a network is compromised, authorized users may mitigate damage by limiting the actions that the compromised device is able to take.

Figure 6:
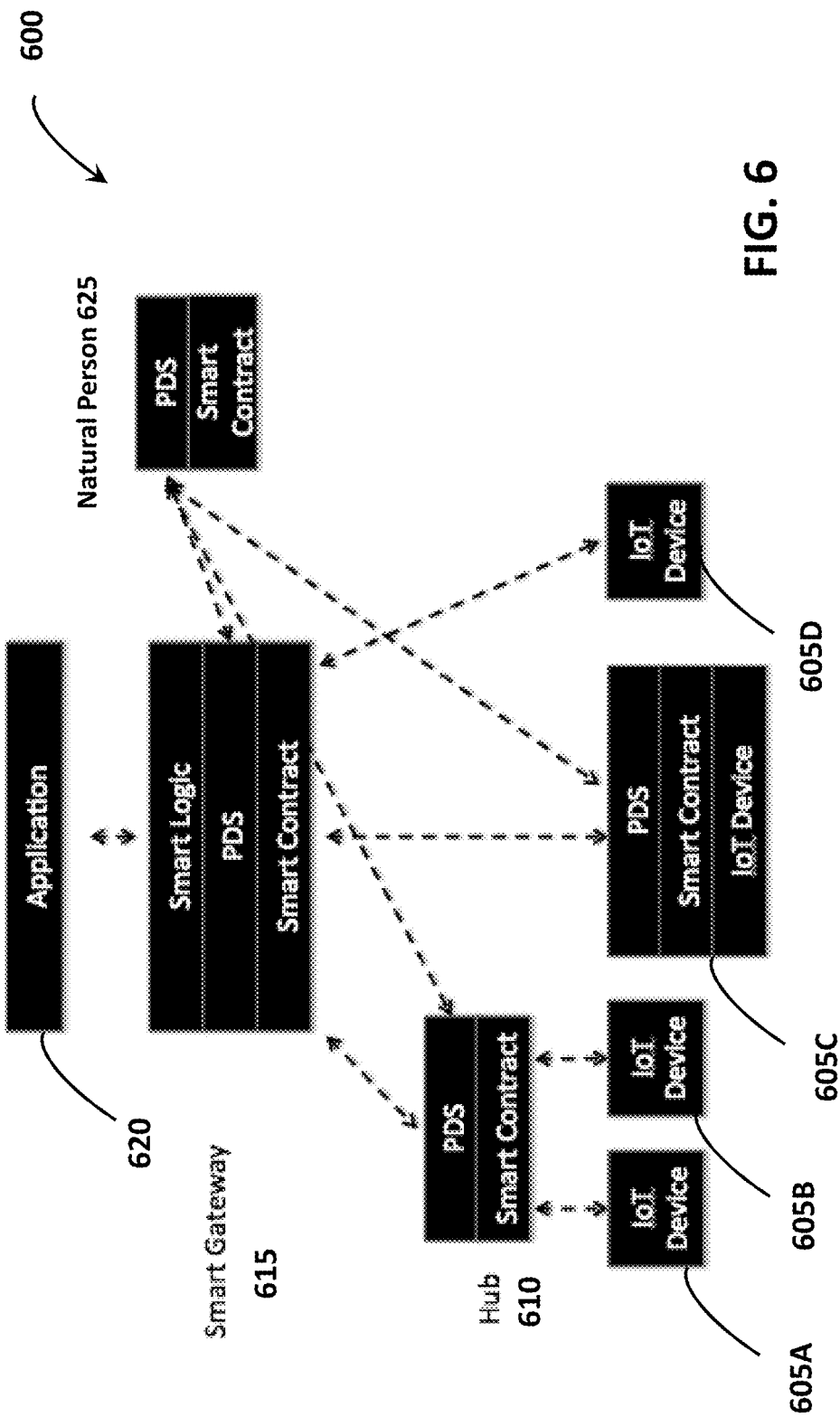
FIG. 6 shows an illustrative system 600 comprising a plurality of connected devices, in accordance with some embodiments.

FIG. 6 shows an illustrative system 600 comprising a plurality of connected devices, in accordance with some embodiments. These devices may be adapted to communicate and/or share information with one another. For instance, the system 600 may include IoT devices that are installed on a factory floor and adapted to collect data and/or control factory equipment, as discussed above in connection with the example of FIG. 2. Additionally, or alternatively, the system 600 may include mobile devices of employees, managers, visitors, etc., as discussed above in connection with the example of FIG. 2. However, it should be appreciated that the techniques described herein may be applied in contexts other than a manufacturing facility. For instance, in some embodiments, the system 600 may include devices in a home and/or a vehicle.

In the example of FIG. 6, one or more of the connected devices may have respective PDSes and DIRs. As discussed above, a DIR may be implemented as a smart contract on a distributed ledger system.

In some embodiments, the plurality of connected devices of FIG. 6 may include one or more end devices, such as end devices 605A-D. Additionally, or alternatively, the plurality of connected devices of FIG. 6 may include one or more hubs, such as a hub 610. Additionally, or alternatively, the plurality of connected devices of FIG. 6 may include one or more smart gateways, such as a smart gateway 615.

In some embodiments, data sent from an end device may be end-to-end encrypted with a public key of an intended recipient of the data (e.g., an application 620). As one example, distributed ledger keys may be used for encryption/decryption. As another example, new asymmetric keys may be generated (e.g. PGP/GPG key pairs).

In some embodiments, a smart gateway (e.g., the smart gateway 615) may connect together all devices in a network environment. A hub (e.g., the hub 610) and/or an end device (e.g., the end device 605C or 605D) may connect to the smart gateway via a secure protocol, such as TLS or a similar protocol. In some embodiments, the smart gateway may have a PDS and a corresponding DIR. The PDS and/or the corresponding DIR may store attribute values relating to one or more devices connected to the smart gateway directly or indirectly (e.g., via the hub 610). Additionally, or alternatively, the PDS and/or the corresponding DIR may store attribute values relating to one or more natural persons (e.g., one or more attribute values shared by a natural person's PDS).

In some embodiments, a smart gateway may use contextual information, such as current state of one or more devices (e.g. lighting, temperature, etc.) and/or shared attributes, to optimize a system controlled by the smart gateway (e.g., the system 600 in the example of FIG. 6). In some embodiments, any item of information shared between two or more entities may be indicated as a "shared attribute." Examples of shared attributes include, but are not limited to, sensor data, device name, device identifier, hardware and/or software specification, brand, model. The smart gateway may acquire contextual information directly from an end device, or via another device (e.g., the hub 610), and may have logic capabilities for coordinating actions among connected devices in the system.

In some embodiments, a hub (e.g., the hub 610) may be responsible for routing network traffic from a collection of end devices to a smart gateway (e.g., the smart gateway 615). The hub may act as a gate between outside devices and one or more end devices that are connected to the hub. For instance, the hub may have a PDS and/or a corresponding DIR, which may store attribute values pertaining to the one or more end devices, such as an access policy (e.g., read, write, and/or other type of access). The PDS and/or the corresponding DIR may apply one or more rules associated with the access policy, and may filter out communication from parties that are not authorized to access the one or more end devices. In this manner, a hub may provide a granular way to control an end device that does not have its own PDS.

In some embodiments, an end device (e.g., end devices 605C) may host its own PDS, and/or may connect directly to a smart gateway (e.g., the smart gateway 615) via a secure protocol, such as TLS or a similar protocol. Examples of such end devices include, but are not limited to, a smart thermostat (e.g., Nest), a smart fridge (e.g., Samsung Family Hub), a smart energy storage (e.g., Tesla Powerwall), etc.

In some embodiments, an end device's PDS may store attribute values indicating guest access, data streaming destinations, etc. The PDS and/or a corresponding DIR may perform access control based on one or more attribute values. For instance, an attribute value may include an access policy having one or more associated rules. The PDS and/or the corresponding DIR may apply the one or more rules to filter out communication from parties that do not have access to the end device.

In some embodiments, an end device (e.g., the end devices 605A-B) may not host a PDS, but may use a secure protocol, such as Transport Layer Security (TLS) or a similar protocol, to connect to a local hub (e.g., the hub 610). In this manner, a PDS and/or a corresponding DIR of the hub may perform access control on behalf of the end device. For instance, an access policy having one or more associated rules may be stored and enforced for the end device. Examples of such end devices include, but are not limited to, security cameras, light bulbs, sensors (e.g., collections of sensors in a selected area), etc.

In some embodiments, an end device (e.g., end devices 605D) may not host a PDS, but may connect directly to a smart gateway (e.g., the smart gateway 615) via a secure protocol, such as TLS or a similar protocol. In this manner, a PDS and/or a corresponding DIR of the smart gateway may perform access control on behalf of the end device. For instance, an access policy having one or more associated rules may be stored and enforced for the end device. Examples of such end devices include, but are not limited to, a tire pressure gauge in a vehicle, a heat sensor in a vehicle, etc.

In some embodiments, a smart gateway (e.g., the smart gateway 615), a hub (e.g., the hub 610), and/or an end device (e.g., the end device 605C) may communicate with a PDS and/or a corresponding DIR of a natural person (e.g., a natural person 625). The natural person's PDS may store attribute values of the natural person, whereas attestations of the attribute values may be stored in the corresponding DIR, which may be on a distributed ledger.

In some embodiments, an application (e.g., the application 620) may be connected to a smart gateway (e.g., the smart gateway 615) either directly or via one or more intermediaries. The application may provide a user interface that allows a user to control one or more devices in the system 600. For instance, the user interface may allow a user to change preferences (e.g., lighting, temperature, etc.), approve guest access, transfer ownership, etc. In some embodiments, this may be done by modifying one or more attribute values in a PDS of a device.

It should be appreciated that the system 600 is shown in FIG. 6 and described above solely for purposes of illustration. Aspects of the present disclosure are not limited to any particular device or combination of devices.

Figure 7:
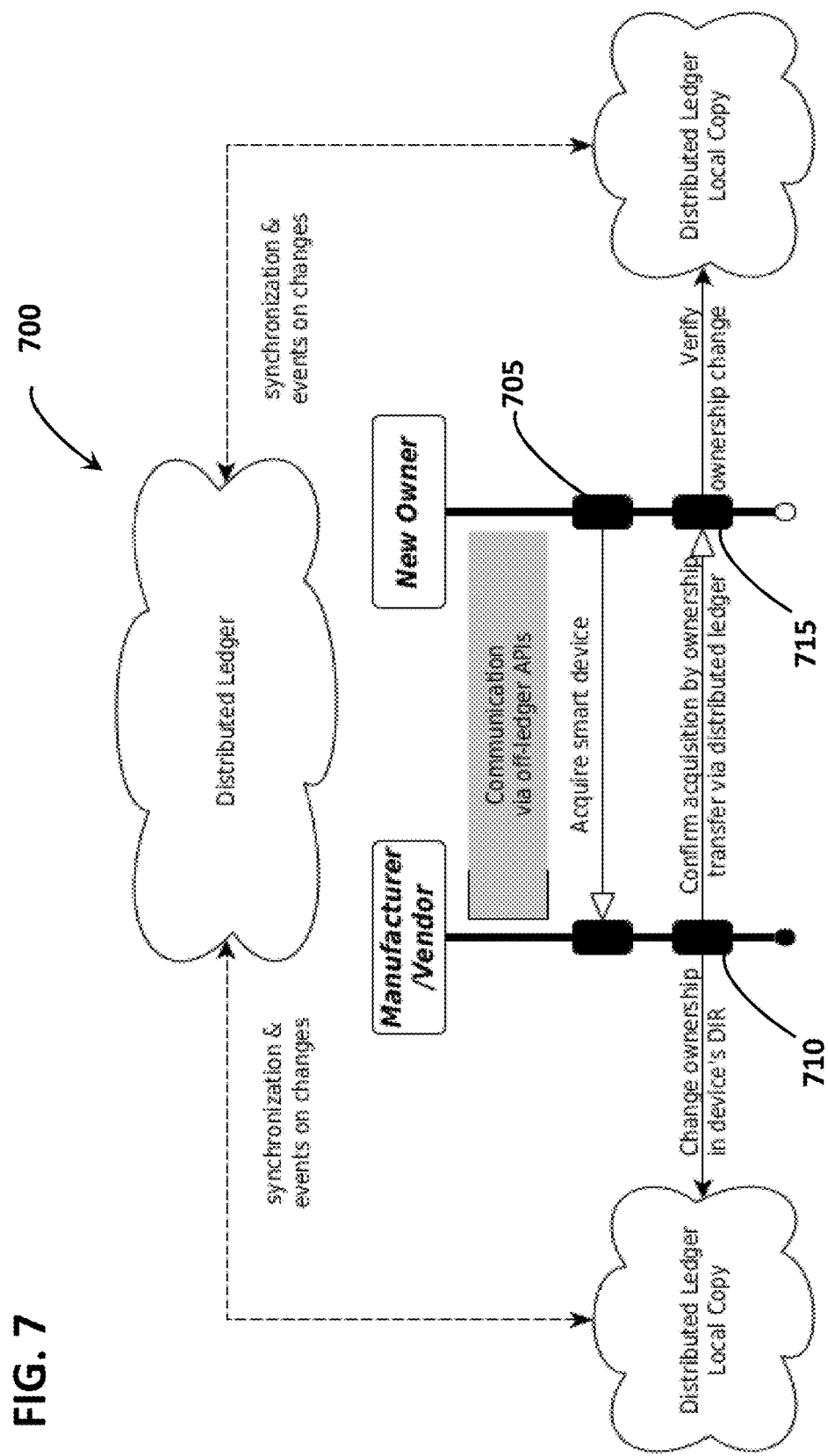
FIG. 7 shows an illustrative process 700 for transferring ownership of a device, in accordance with some embodiments.

FIG. 7 shows an illustrative process 700 for transferring ownership of a device, in accordance with some embodiments. For instance, the process 700 may be performed between a previous owner (e.g., a manufacturer or a vendor) and a new owner (e.g., an end user) of the device.

In some embodiments, prior to initiating the process 700, a PDS of the previous owner and a PDS of the new owner may establish communication, for example, via one or more off-ledger application programming interfaces (APIs). At act 705, the new owner's PDS may send an ownership transfer request to the previous owner's PDS, indicating that the new owner has acquired a device (e.g., the illustrative smart gateway 615 in the example of FIG. 6).

In some embodiments, upon receiving the ownership transfer request, the previous owner's PDS may confirm that the new owner has indeed acquired the device. For instance, the new owner's PDS may send (e.g., along with the ownership transfer request) a proof that the new owner is physically in possession of the device (e.g., a one-time code associated with the device and included inside the device's packaging), and the previous owner's PDS may check that proof. In this manner, privacy of the new owner may be protected. However, that is not required. In some embodiments, the previous owner's PDS may perform a counterparty check with the new owner's PDS to confirm identity of the new owner (e.g., by requesting that the new owner's PDS send identity-related attribute values, and then checking corresponding attestations on a distributed ledger, for example, in a DIR of the new owner). The previous owner's PDS may then look up a purchase record to confirm that the new owner has indeed acquired the device.

In some embodiments, the device may have a PDS and a corresponding DIR, which may be hosted by the device or a related device (e.g., a hub or a smart gateway to which the device is connected). The PDS may have an "owner" attribute (which may be an example of a "belongsTo" attribute), which may store an identifier of the previous owner (e.g., a cryptographic public key associated with the previous owner). An attestation of this attribute may be stored in the corresponding DIR, for example, in a badge in the DIR.

At act 710, the previous owner's PDS may initiate a process with the device's PDS to update the "owner" attribute, for example, by substituting the previous owner's cryptographic public key with the new owner's cryptographic public key. During this process, the device's PDS and/or the corresponding DIR may check that one or more privilege labels in the previous owner's PDS are attested to by a trusted entity, and/or may apply one or more rules associated with an access policy, to confirm that the previous owner is allowed to update the "owner" attribute of the device (e.g., as described above in connection with FIG. 5). Additionally, or alternatively, the device's PDS and/or the corresponding DIR may perform a counterparty check with the previous owner's PDS to confirm identity of the previous owner (e.g., by requesting that the previous owner's PDS send identity-related attribute values, and then checking corresponding attestations on a distributed ledger, for example, in a DIR of the previous owner).

In some embodiments, the previous owner's PDS may be a PDS of an employee of the previous owner. The device's PDS and/or the corresponding DIR may check that the employee is authorized by the previous owner to update the "owner" attribute of the device. This may be done in any suitable manner, for instance, by checking that one or more privilege labels in the employee's PDS are attested to by a trusted entity, and/or by applying one or more rules associated with an access policy (e.g., as described above in connection with FIG. 5).

In some embodiments, if one or more appropriate checks are successful, the device's PDS may update the "owner" attribute to store the new owner's public key. The device's PDS may prepare an attestation for the updated attribute value, and may request that the previous owner's PDS check and sign the attestation. Upon successfully checking and signing the attestation, the previous owner's PDS and/or corresponding DIR may cause the attestation to be in a VERIFIED state on a distributed ledger. This may finalize the ownership transfer, so that the new owner may have full access to the device in the future, whereas the previous owner may no longer have any access.

At act 715, the new owner's PDS may confirm that ownership has indeed been updated, for example, by accessing the device's DIR to check that the attestation was generated based on the new owner's public key and is in a VERIFIED state, and that the previous owner has signed the attestation.

Figure 8:
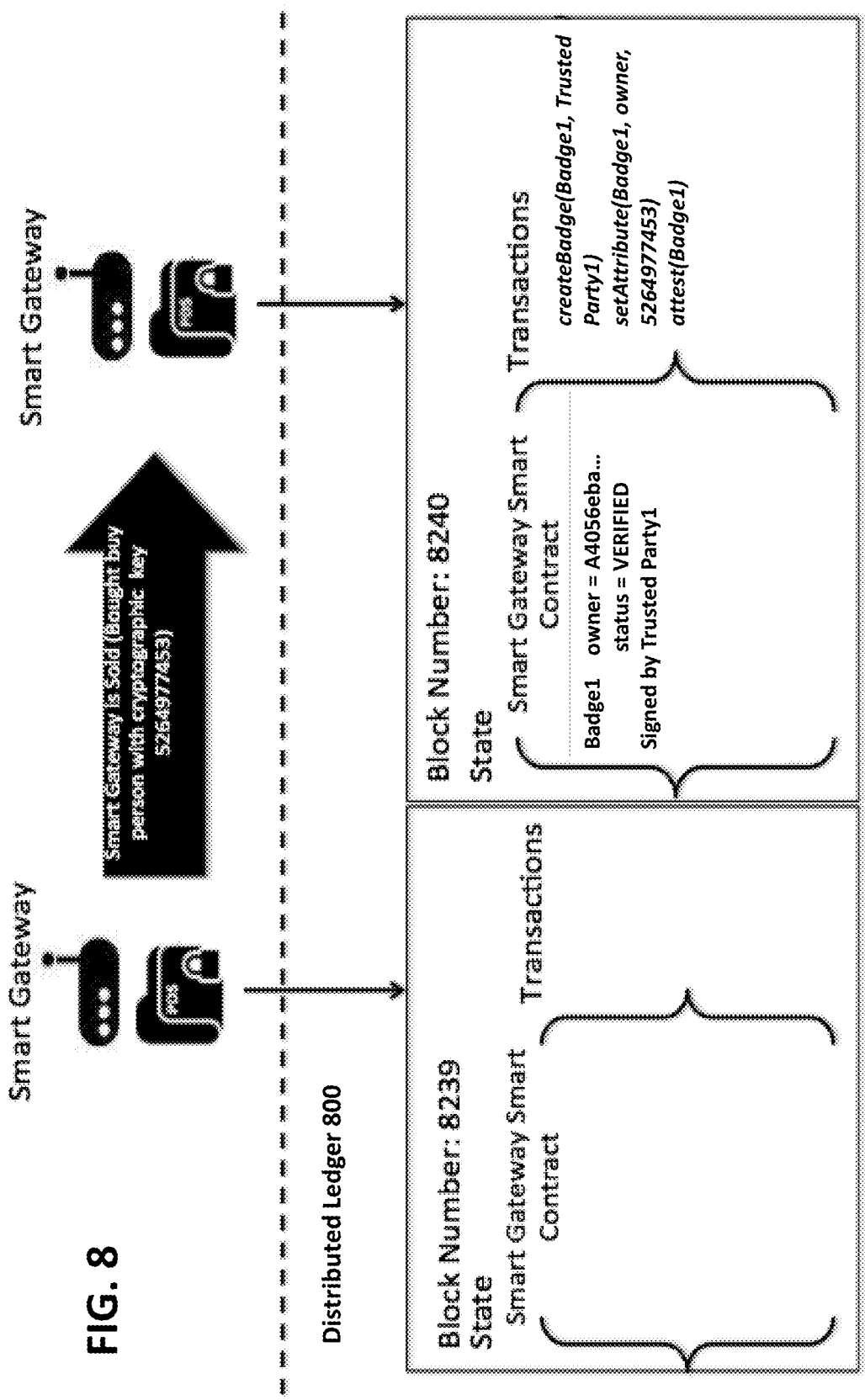
FIG. 8 shows an illustrative distributed ledger 800, in accordance with some embodiments.

FIG. 8 shows an illustrative distributed ledger 800, in accordance with some embodiments. For instance, the distributed ledger 800 may store an attestation for an "ownership" attribute for a smart gateway. This attestation may be published to the distributed ledger 800 during an ownership transfer process, as discussed above in connection with FIG. 7.

In some embodiments, the smart gateway may be built with one or more PDS functionalities. When a purchaser (e.g., a consumer) buys this device from a previous owner (e.g., a manufacturer or a vendor), the owner attribute in the smart gateway's PDS is updated (e.g., by the previous owner) to the purchaser's public key. For instance, the smart gateway's PDS may send a createBadge transaction to the smart gateway's DIR. One or more trusted entities (e.g., the purchaser and/or the previous owner) who are requested to sign the attribute attestations in the badge may be made explicit in this transaction.

In some embodiments, a setAttribute transaction may be sent by the smart gateway's PDS to the corresponding DIR. The setAttribute transaction may include a badge identifier, an indication that the "owner" attribute is to be updated, and/or a plain text value of the purchaser's cryptographic key (e.g., "5264977453" in the example of FIG. 8). The DIR may generate an attestation (e.g., by hashing the plain text value of the purchaser's cryptographic key), and may store the attestation in the badge. As a result of the setAttribute transaction, the one or more trusted entities may receive a notification to verify and sign this badge.

In some embodiments, after a trusted entity verifies the updated attribute value (e.g., the plain text value of the purchaser's cryptographic key), an attest transaction may be sent from the trusted entity's PDS to the smart gateway's PDS. When all of the one or more trusted entities have verified this attribute value, a state of the corresponding attestation in the smart gateway's DIR may be set to VERIFIED.

Although an "ownership" relationship between a device and a natural person (or organization) is described above in connection with FIGS. 7-8, it should be appreciated that the techniques described herein may be used to manage other types of relationships, such as a "guest" relationship. Moreover, the inventors have recognized and appreciated that, as IoT devices become more prevalent (e.g. smart homes, smart cars, smart factories, smart cities, etc.), it may be desirable to define relationships between devices.

In some embodiments, a relationship between a PDS of a first device and a PDS of a second device may be provided to indicate that the first device is connected to the second device. For instance, a "gatewayConnectedTo" attribute (or a "hubConnectedTo" attribute) may be provided in a PDS of an end device, and may store an identifier of a PDS of a gateway (or hub) to indicate that the end device is connected to the gateway (or hub). The identifier may be a cryptographic key associated with the gateway (or hub). Such a "gatewayConnectedTo" relationship (or "hubConnectedTo" relationship) may be a subtype of a "connectedTo" relationship.

In some embodiments, "connectedTo" status may allow transmission of data to, and/or receipt of data from, an entity. In some embodiments, data may be end-to-end encrypted for a receiving entity. A value of a "connectedTo" attribute, and/or a similar attribute, may be used to extract a public cryptographic key for the encryption process. Thus, a "connectedTo" attribute may be used for authorization purposes (e.g., implicitly by encrypting data, and/or explicitly by checking access rights).

In some embodiments, a hub (e.g., a Philips Hue Hub) may manage multiple IoT devices (e.g., light bulbs), but may not provide higher-level logic. By contrast, a smart gateway may provide higher-level logic, such as logic for reasoning over data collected from the IoT devices and/or automatic configuring the IoT devices based on an owner's preferences. In some embodiments, a smart gateway may manage multiple hubs and/or multiple IoT devices. An IoT device may be connected to the smart gateway, and may be managed by the smart gateway directly. Additionally, or alternatively, an IoT device may be managed by the smart gateway indirectly, for example, via a hub or another suitable network device.

The inventors have recognized and appreciated that it may be beneficial to capture device relationships in a distributed ledger (e.g., a blockchain). As one example, it may be beneficial to capture authentication and/or authorization information in a tamper-resistant and trusted way. For instance, in some embodiments, a relationship may be attested to (e.g., verified and/or signed) by an owner of the devices, in addition to being attested to by the devices themselves. As another example, capturing device relationships in a distributed ledger may provide a PKI (Public Key Infrastructure) for encrypting data end-to-end (e.g., using public keys of devices that are intended recipients of the data, so that only such devices will have access).

Figure 9:
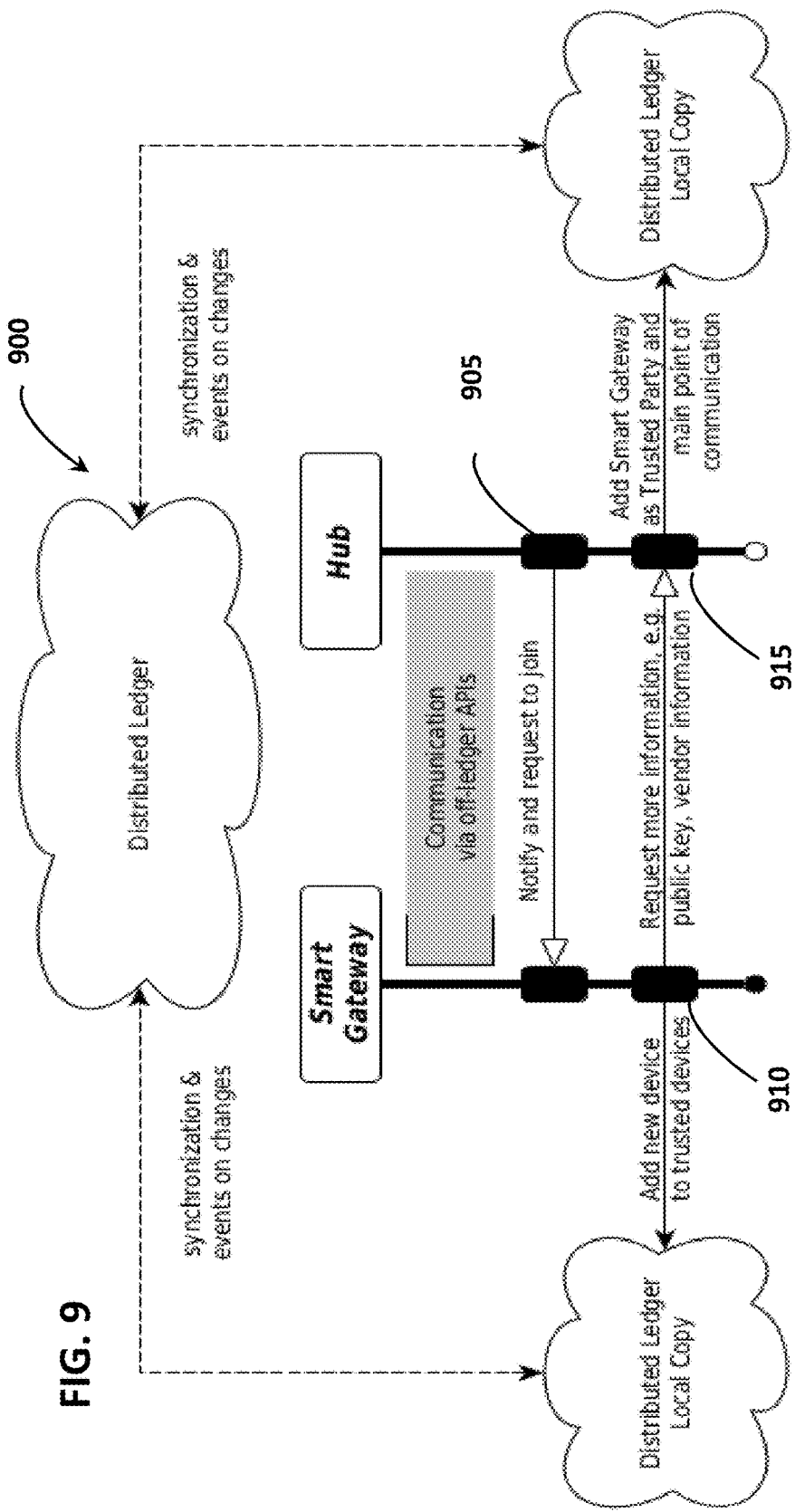
FIG. 9 shows an illustrative process 900 for establishing a relationship between two devices, in accordance with some embodiments.

FIG. 9 shows an illustrative process 900 for establishing a relationship between two devices, in accordance with some embodiments. For instance, the process 900 may be performed between a smart gateway (e.g., the illustrative smart gateway 615 in the example of FIG. 6) and a hub (e.g., the illustrative hub 610 in the example of FIG. 6) to establish an initial association (e.g., when the hub first connects to the smart gateway).

In some embodiments, prior to initiating the process 900, a PDS of the smart gateway and a PDS of the hub may establish communication, for example, via one or more off-ledger application programming interfaces (APIs).

At act 905, the hub's PDS may send a connection request to the smart gateway's PDS. At act 910, the smart gateway's PDS may confirm that the hub is authorized to connect to the smart gateway. For instance, the smart gateway's PDS may perform a counterparty check with the hub's PDS to determine who owns the hub. In some embodiments, the smart gateway's PDS may do so by requesting that the hub's PDS send a value in an "owner" attribute in the hub's PDS (e.g., a public key of an owner of the hub), and then checking a corresponding attestation on a distributed ledger (e.g., in a DIR of the hub). The smart gateway's PDS may then determine whether the owner of the hub is allowed to access the smart gateway (e.g., whether the hub and the smart gateway are owned by the same entity).

Additionally, or alternatively, the smart gateway's PDS may request that the hub's PDS present one or more privilege labels. The smart gateway's PDS and/or the corresponding DIR may check that the one or more privilege labels have been attested to by a trusted entity, such as the owner of the smart gateway, and may apply one or more rules associated with an access policy, for example, as described above in connection with FIG. 5.

In some embodiments, if one or more appropriate checks are successful, the smart gateway's PDS may create a "hubConnectedTo" attribute to store an identifier of the hub (e.g., a cryptographic public key corresponding to the hub's PDS). Additionally, or alternatively, the smart gateway's PDS and/or the corresponding DIR may generate an attestation based on the value of the "hubConnectedTo" attribute, and may publish the attestation to a distributed ledger. The attestation may, although need not, be stored in a badge in the DIR. The smart gateway's PDS and/or the corresponding DIR may then request that a trusted entity verify the value of the "hubConnectedTo" attribute, sign the attestation, and cause the attestation to be in a VERIFIED state.

In some embodiments, the owner of the smart gateway may be requested to sign the attestation of the value of the "hubConnectedTo" attribute. Thus, the owner of the smart gateway may be able to accept or reject the automatically established relationship between the smart gateway and the hub. This may introduce a human component, thereby increasing trust and assuring higher quality relationships. However, it should be appreciated that aspects of the present disclosure are not limited to having a human confirm an automatically established relationship between devices.

At act 915, the hub's PDS may confirm that the connection with the smart gateway has been properly attested to via the distributed ledger, for example, by accessing the smart gateway's DIR to check that the attestation was generated based on the value of the "hubConnectedTo" attribute and is in a VERIFIED state, and that the owner of the smart gateway has signed the attestation.

In some embodiments, the hub's PDS may create a "gatewayConnectedTo" attribute to store an identifier of the smart gateway (e.g., a cryptographic public key corresponding to the smart gateway's PDS). Additionally, or alternatively, the hub's PDS and/or the corresponding DIR may generate an attestation based on the value of the "gatewayConnectedTo" attribute, and may publish the attestation to a distributed ledger. The attestation may, although need not, be stored in a badge in the DIR. The hub's PDS and/or the corresponding DIR may then request that a trusted entity verify the value of the "gatewayConnectedTo" attribute, sign the attestation, and cause the attestation to be in a VERIFIED state.

In some embodiments, the owner of the hub may be requested to sign. (The owner of the hub may be the same as, or different from, the owner of the smart gateway.) Thus, the owner of the hub may be able to accept or reject the automatically established relationship between the smart gateway and the hub. This may introduce a human component, thereby increasing trust and assuring higher quality relationships. However, it should be appreciated that aspects of the present disclosure are not limited to having a human confirm an automatically established relationship between devices.

Figure 10:
FIG. 10 shows another illustrative distributed ledger 1050, in accordance with some embodiments.

FIG. 10 shows another illustrative distributed ledger 1050, in accordance with some embodiments. For instance, the distributed ledger 1050 may store an attestation for a "hubConnectedTo" attribute for a smart gateway and/or an attestation for a "gatewayConnectedTo" attribute for a hub. One or more of these attestations may be published to the distributed ledger 1050 during a relationship establishing process, for example, as discussed above in connection with FIG. 9.

In some embodiments, when a hub is purchased, an initialization process may be carried out. This initialization process may be similar to that described for a smart gateway in connection with FIGS. 7-8.

In some embodiments, once the hub is connected to a power source and enters a discoverable phase, the hub may begin an initial handshake with a closest smart gateway (e.g., as determined based on signal strength using any one or more communication technologies such as 802.11, Bluetooth, ZigBee, etc.). After the initial handshake, the hub may send to the smart gateway a value of the hub's "owner" attribute. Additionally, or alternatively, the hub may send to the smart gateway a pointer to a distributed ledger location where an attestation for the hub's "owner" attribute may be found.

In some embodiments, the smart gateway's PDS may check that the attestation for the hub's "owner" attribute was generated based on the received value of the hub's "owner" attribute and is in a VERIFIED state, and that a trusted entity has signed the attestation. If these checks are successful, and if the hub and the smart gateway are owned by the same entity, the smart gateway may establish a secure connection with the hub, for example, using TLS or a similar protocol.

In some embodiments, if the value of the hub's "owner" attribute does not match the value of the smart gateway's "owner" attribute (e.g., the hub has connected to a neighboring gateway, the hub's owner may manually enter an address (e.g. a MAC address and/or an IP address), of the hub via a user interface of the smart gateway. This may allow the hub to connect to the intended gateway, and retry the confirmation process.

In some embodiments, after the secure connection has been established, the smart gateway's cryptographic key may be added to the hub's PDS, for example, in a "gatewayConnectedTo" attribute. The hub's PDS may send a createBadge transaction to a corresponding DIR. One or more trusted entities (e.g., the gateway and/or the owner) who are requested to sign the attribute attestations in the badge may be made explicit in this transaction.

In some embodiments, a setAttribute transaction may be sent by the hub's PDS to the corresponding DIR. The setAttribute transaction may include a badge identifier, an indication that the "gatewayConnectedTo" attribute is to be updated, and/or a plain text value of the smart gateway's cryptographic key (e.g., "gateway1" in the example of FIG. 10). The DIR may generate an attestation (e.g., by hashing the plain text value of the smart gateway's cryptographic key), and may store the attestation in the badge. As a result of the setAttribute transaction, the one or more trusted entities may receive a notification to verify and sign this badge.

In some embodiments, after a trusted entity verifies the updated attribute value (e.g., the plain text value of the smart gateway's cryptographic key), an attest transaction may be sent from the trusted entity's PDS to the hub's PDS. When all of the one or more trusted entities have verified this attribute value, a state of the corresponding attestation in the hub's DIR may be set to VERIFIED.

In some embodiments, the smart gateway's PDS may undergo a similar process to add the hub's cryptographic key, for example, in a "hubConnectedTo" attribute. The smart gateway's PDS may send a createBadge transaction to a corresponding DIR. One or more trusted entities (e.g., the hub and/or the owner) who are requested to sign the attribute attestations in the badge may be made explicit in this transaction.

In some embodiments, a setAttribute transaction may be sent by the hub's PDS to the corresponding DIR. The setAttribute transaction may include a badge identifier, an indication that the "hubConnectedTo" attribute is to be updated, and/or a plain text value of the hub's cryptographic key (e.g., "hub1" in the example of FIG. 10). The DIR may generate an attestation (e.g., by hashing the plain text value of the hub's cryptographic key), and may store the attestation in the badge. As a result of the setAttribute transaction, the one or more trusted entities may receive a notification to verify and sign this badge.

In some embodiments, after a trusted entity verifies the updated attribute value (e.g., the plain text value of the hub's cryptographic key), an attest transaction may be sent from the trusted entity's PDS to the smart gateway's PDS. When all of the one or more trusted entities have verified this attribute value, a state of the corresponding attestation in the smart gateway's DIR may be set to VERIFIED.

In some embodiments, the hub may perform access control based on one or more attribute values. For instance, upon receiving a request from an entity to perform an action, the hub's PDS and/or the corresponding DIR may check that one or more privilege labels in the entity's PDS are attested to by a trusted entity, and/or may apply one or more rules associated with an access policy, to confirm that the entity is allowed to perform the requested action (e.g., as described above in connection with FIG. 5).

Additionally, or alternatively, the hub's PDS and/or the corresponding DIR may perform a counterparty check with the entity's PDS to confirm identity of the entity (e.g., by requesting that the entity's PDS send identity-related attribute values, and then checking corresponding attestations on a distributed ledger, for example, in a DIR of the entity). The hub may then check that the entity has been granted access. For instance, in the example of FIGS. 7-10, only two entities (namely, the smart gateway and the owner) have been granted access to the hub.

Although a hub and a smart gateway are shown in FIGS. 9-10 and described above, it should be appreciated that aspects of the present disclosure are not limited to any particular combination of devices. In some embodiments, one or more of the techniques described herein may be used to establish a relationship between a hub and an end device, or between a smart gateway and an end device.

As one example, a homeowner may purchase a smart light bulb and a corresponding hub. When the homeowner screws the light bulb into a socket, the light bulb may receive power, and may enter into discoverable mode. The hub may discover the light hub and determine that the light bulb has not been configured yet. Accordingly, the hub may send a connection request to the light bulb.

In some embodiments, a user interface application may be installed on the homeowner's device (e.g., smartphone, tablet, laptop, etc.), and may be used by the homeowner to monitor and/or configure the hub and/or other devices in the home (e.g., a smart gateway). The homeowner may grant the user interface application access to the hub (e.g., as described above in connection with FIG. 5). If such access is granted, the hub may send a notification to the user interface application when the hub discovers the new light bulb. If a public key of the new bulb is different from a public key of a bulb purchased by the owner—the latter may be found inside the purchased bulb's packaging—the owner may use the user interface application to instruct the hub to disconnect from the bulb. In some embodiments, if the hub and the correct bulb are not able to connect, the home owner may manually enter an address (e.g., a MAC address and/or an IP address) of the correct bulb via the user interface application.

In some embodiments, when the hub's connection request is confirmed by the correct bulb, a PDS of the hub may send a createBadge transaction to a corresponding DIR. One or more trusted entities (e.g., the light bulb and/or the homeowner) who are requested to sign the attribute attestations in the badge may be made explicit in this transaction.

In some embodiments, a setAttribute transaction may be sent by the hub's PDS to the corresponding DIR. The setAttribute transaction may include a badge identifier, an indication that a "lightConnectedTo" attribute is to be updated, and/or a plain text value of the light bulb's cryptographic key. The DIR may generate an attestation (e.g., by hashing the plain text value of the light bulb's cryptographic key), and may store the attestation in the badge. As a result of the setAttribute transaction, the one or more trusted entities may receive a notification to verify and sign this badge.

In some embodiments, after a trusted entity verifies the updated attribute value (e.g., the plain text value of the light bulb's cryptographic key), an attest transaction may be sent from the trusted entity's PDS to the hub's PDS. When all of the one or more trusted entities have verified this attribute value, a state of the corresponding attestation in the hub's DIR may be set to VERIFIED.

In some embodiments, a smart light bulb may perform access control based on one or more attribute values. For instance, upon receiving a request from an entity to perform an action, the light bulb's PDS and/or a corresponding DIR may check that one or more privilege labels in the entity's PDS are attested to by a trusted entity, and/or may apply one or more rules associated with an access policy, to confirm that the entity is allowed to perform the requested action (e.g., as described above in connection with FIG. 5).

Additionally, or alternatively, the light bulb's PDS and/or the corresponding DIR may perform a counterparty check with the entity's PDS to confirm identity of the entity (e.g., by requesting that the entity's PDS send identity-related attribute values, and then checking corresponding attestations on a distributed ledger, for example, in a DIR of the entity). The light bulb may then check that the entity has been granted access.

In some embodiments, if the light bulb does not host its own PDS and corresponding DIR, a hub's PDS and a corresponding DIR may perform access control on behalf of the light bulb. Additionally, or alternatively, a smart gateway's PDS and a corresponding DIR may perform access control on behalf of the light bulb.

In some embodiments, a smart gateway may perform a routing function (e.g., using a routing table). For instance, upon receiving a request from an entity to perform an action (e.g., requesting guest access), the smart gateway may identity a device to which the request is directed (e.g., a hub or an end device), and may forward the request to the device. The device may then check if the entity is allowed to perform the requested action.

In some embodiments, an authorized person may grant another person guest access to a target device. For instance, the authorized person may send a request directly to a device that hosts the target device's PDS. Such a device may be a smart gateway, a hub, or the target device itself. Additionally, or alternatively, the authorized person may send a request to a smart gateway, which may forward (e.g., using a routing table) the request to the device that hosts the target device's PDS.

In some embodiments, upon receiving a request to allow guest access, the target device's PDS may check that the requesting entity is allowed to grant guest access to the target device. For instance, the target device's PDS and/or the corresponding DIR may perform a counterparty check with the requesting entity's PDS to confirm identity of the requesting entity (e.g., by requesting that the requesting entity's PDS send identity-related attribute values, and then checking corresponding attestations on a distributed ledger, for example, in a DIR of the requesting entity). In this manner, the target device's PDS may be able to confirm that the requesting entity is an owner of the target device, or some other entity that is allowed to grant guest access to the target device.

Additionally, or alternatively, the requesting entity's PDS may present one or more privilege labels, and the target device's PDS and/or the corresponding DIR may check that the one or more privilege labels are attested to by a trusted entity, and/or may apply one or more rules associated with an access policy to confirm that the requesting entity is allowed to grant guest access to the target device (e.g., as described above in connection with FIG. 5). In some embodiments, if one or more appropriate checks are successful, the target device's PDS may create a "guest" attribute to store an identifier of the guest (e.g., a cryptographic public key corresponding to the guest's PDS). Additionally, or alternatively, the target device's PDS may send a createBadge transaction to the corresponding DIR. One or more trusted entities (e.g., an owner of the target device, the authorized person, and/or one or more devices that manage the target device, such as a hub, a smart gateway, etc.) who are requested to sign the attribute attestations in the badge may be made explicit in this transaction.

In some embodiments, a setAttribute transaction may be sent by the target device's PDS to the corresponding DIR. The setAttribute transaction may include a badge identifier, an indication that a "guest" attribute is to be updated, and/or a plain text value of the guest's cryptographic key. The DIR may generate an attestation (e.g., by hashing the plain text value of the guest's cryptographic key), and may store the attestation in the badge. As a result of the setAttribute transaction, the one or more trusted entities may receive a notification to verify and sign this badge.

In some embodiments, after a trusted entity verifies the updated attribute value (e.g., the plain text value of the guest's cryptographic key), an attest transaction may be sent from the trusted entity's PDS to the target device's PDS. When all of the one or more trusted entities have verified this attribute value, a state of the corresponding attestation in the target device's DIR may be set to VERIFIED.

In some embodiments, an expiration date may be provided when guest access is granted. This may be enforced using the illustrative state machine 300 in the example of FIG. 3, where an attestation may be moved from a VERIFIED state to an EXPIRED state after a selected amount of time has elapsed.

As discussed above in connection with FIG. 2, different access modes may be provided for a device to allow access to different sets of functionalities, different categories of data, etc. For instance, a guest may rent a home via a broker (e.g., Airbnb), and may be granted temporary access to a subset of functionalities and/or data of one or more device in the home (e.g., WiFi access point, smart lighting, etc.). The access grant may be limited in time (e.g., duration of the guest's stay) and/or location (e.g., guest room and/or one or more designated areas within the home). In some embodiments, identity and/or other relevant information (e.g., length of stay) may be cross-referenced against the broker's platform, which may further increase automation and trust.

Figure 11:
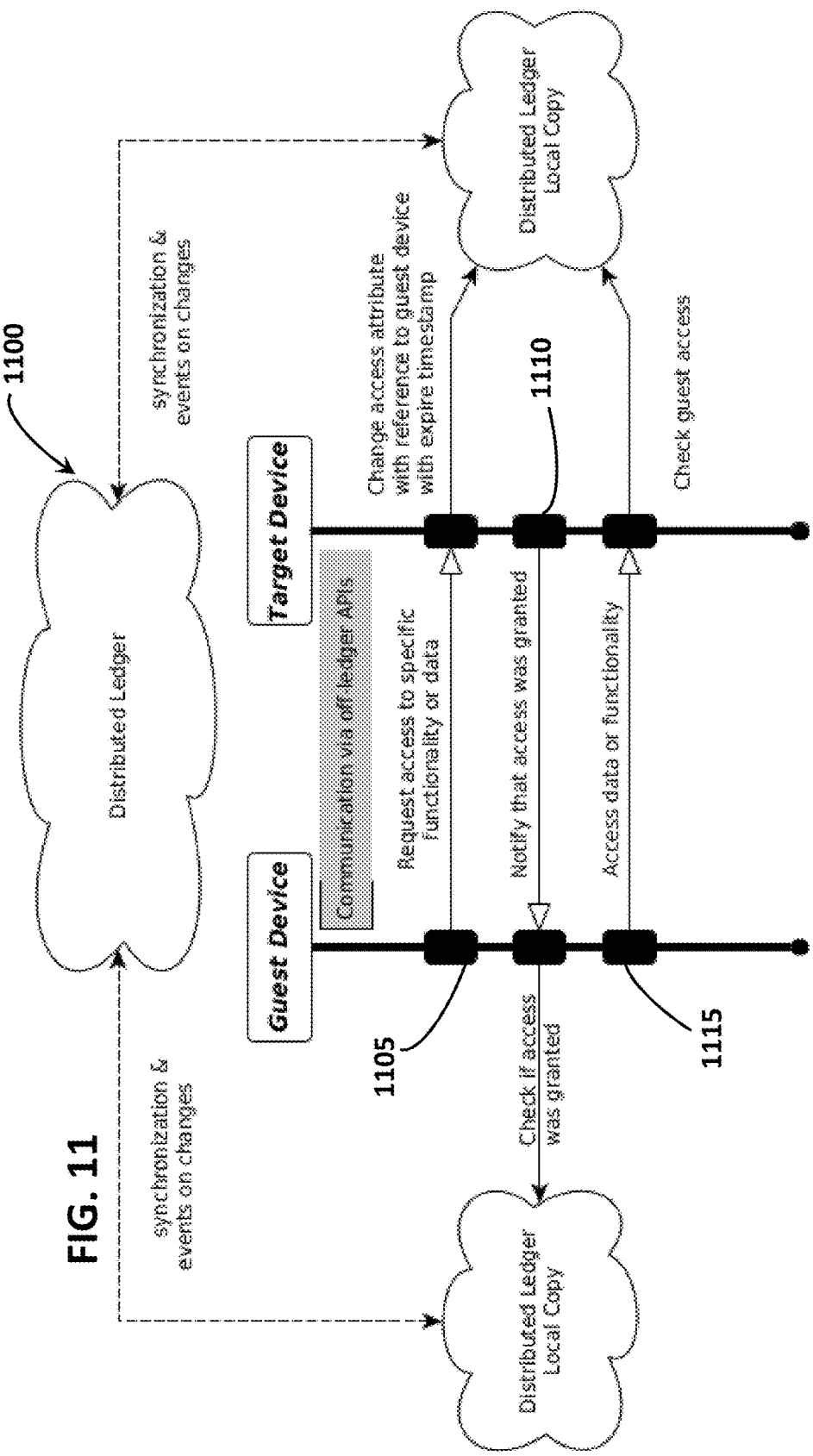
FIG. 11 shows an illustrative process 1100 for requesting guest access, in accordance with some embodiments.

FIG. 11 shows an illustrative process 1100 for requesting guest access, in accordance with some embodiments. For instance, the process 1100 may be performed between a guest device (e.g., a guest's smartphone) and a target device (e.g., a smart lighting hub) to give the guest device access to one or more selected functionalities and/or pieces of data (e.g., to control lighting in a selected guest room).

In some embodiments, prior to initiating the process 1100, a PDS of the guest device and a PDS of the target device may establish communication, for example, via one or more off-ledger application programming interfaces (APIs). The devices may exchange contextual information, such as an expected length of stay, a relationship between an owner of the guest device and an owner of the target device, etc.

At act 1105, the guest device's PDS may send an access request to the target device's PDS. The access request may identify one or more functionalities and/or pieces of data. The target device's PDS may determine whether the guest device should be allowed to access the one or more identified functionalities and/or pieces of data.

In some embodiments, access rights may be managed via a trust layer (e.g., via a distribute ledger). For instance, the target device's PDS may perform a counterparty check with the guest device's PDS to determine who owns the guest device. In some embodiments, the target device's PDS may do so by requesting that the guest device's PDS send a value in an "owner" attribute in the guest device's PDS (e.g., a public key of the owner of the guest device), and then checking a corresponding attestation on a distributed ledger (e.g., in a DR of the guest device). The target device's PDS may then determine whether the owner of the guest device should be allowed to access the one or more identified functionalities and/or pieces of data. For instance, the guest device's PDS may determine whether the owner of the guest device is on a list of approved guests, which may have been received from a rental broker.

Additionally, or alternatively, the target device's PDS may request that the guest device's PDS present one or more privilege labels. The target device's PDS and/or a corresponding DIR may check that the one or more privilege labels have been attested to by a trusted entity (e.g., the owner of the smart gateway, the rental broker, etc.), and may apply one or more rules associated with an access policy, for example, as described above in connection with FIG. 5. In some embodiments, the one or more rules may take into account contextual information, such as an expected length of stay, a relationship between an owner of the guest device and an owner of the target device (e.g., friend, family member, etc.), etc. Additionally, or alternatively, the one or more rules may take into account the one or more identified functionalities and/or pieces of data.

In some embodiments, if one or more appropriate checks are successful, the target device's PDS may create a "guestDevice" attribute to store an identifier of the guest device (e.g., a cryptographic public key corresponding to the guest device's PDS). An indication of the one or more identified functionalities and/or pieces of data, the access to which has been approved, may be provided with the "guestDevice" attribute.

Additionally, or alternatively, the target device's PDS and/or the corresponding DIR may generate an attestation based on the value of the "guestDevice" attribute and/or the indication of the one or more approved functionalities and/or pieces of data, and may publish the attestation to a distributed ledger. The attestation may, although need not, be stored in a badge in the DIR. The target device's PDS and/or the corresponding DIR may then request that a trusted entity verify the value of the "guestDevice" attribute and/or the indication of the one or more approved functionalities and/or pieces of data, sign the attestation, and cause the attestation to be in a VERIFIED state. The trusted entity may be a device that has been explicitly designated to allow limited and/or temporary access based on one or more policies defined by a human. For instance, the trusted entity may be a router, a hub, or another suitable network device. Additionally, or alternatively, the trusted entity may be a device associated with a physical location, such as a factory or a factory floor within the factory.

In some embodiments, if one or more appropriate checks fail (e.g., due to insufficient contextual or identity information), the target device's PDS may request manual approval from the owner of the target device.

In some embodiments, an expiration date may be provided with the attestation of the "guestDevice" attribute and/or the indication of the approved functionalities and/or pieces of data. This may be enforced using the illustrative state machine 300 in the example of FIG. 3, where an attestation may be moved from a VERIFIED state to an EXPIRED state after a selected amount of time has elapsed. In this manner, access may only be granted for a limited duration (e.g., the expected length of stay), thereby eliminating a need to revoke the access at a later time.

At act 1110, the target device's PDS may inform the guest device's PDS that access has been granted, and the guest device's PDS may confirm that the guest access has been properly attested to via the distributed ledger, for example, by accessing the target device's DIR to check that the attestation was generated based on the value of the "guestDevice" attribute and/or the indication of the approved functionalities and/or pieces of data, that the attestation is in a VERIFIED state, and that a trusted entity has signed the attestation.

At act 1115, the guest device may attempt to access one of the requested functionalities and/or pieces of data. The target device's PDS may check that the requesting device's public key matches the value of the "guestDevice" attribute, and the requested functionality or piece of data is one of the approved functionalities and/or pieces of data. Additionally, or alternatively, the target device's PDS may check that the corresponding attestation in the target device's DIR was generated based on the value of the "guestDevice" attribute and/or the indication of the approved functionalities and/or pieces of data, that the attestation is in a VERIFIED state, and that a trusted entity has signed the attestation.

Although a temporary guest scenario is described above in connection with FIG. 11, it should be appreciated that aspects of the present disclosure are not so limited. In some embodiments, the process 1100 may be used to grant different levels of access to different devices. For instance, a desktop computer of a homeowner may have unlimited access to a smart gateway, whereas a child's smartphone may have limited access.

In some embodiments, access to a target device may be granted by a device that already has access to the target device. For instance, a guest device may perform the process 1100 with the device that already has access to the target device, instead of the target device itself. The device that already has access to the target device may create a badge, and may ask an owner of the target device to sign the badge.

In some embodiments, every device PDS may have an owner attribute. This may allow the owner to either send a transaction directly to a device that hosts a PDS, or have the transaction forwarded through a smart gateway. In this manner, if the smart gateway is hacked, the owner may still send messages to the PDS directly, and may remove the compromised gateway as an authorized device. In some embodiments, the smart gateway may be removed if a majority of trusted entities associated with a "gatewayConnectedTo" attribute of the PDS send transactions to the corresponding DIR to invalidate an attestation of the "gatewayConnectedTo" attribute.

The inventors have recognized and appreciated that a user may wish to share one or more personal attributes (e.g., music play lists, text messages, family members, etc.) with a device (e.g., a smart gateway in the user's home). This may increase the device's contextual awareness. For instance, this may allow the device to perform access control based on the one or more personal attributes (e.g., allowing a device of the user's friend to connect).

FIG. 12 shows another illustrative distributed ledger 1200, in accordance with some embodiments. For instance, the distributed ledger 1200 may store one or more attestations for personal attributes (e.g., full name, date of birth, etc.) of a user. These attestations may, although need not, be stored in a badge in the user's DIR.

In some embodiments, a device (e.g., a smart gateway) may send a service request to a user's PDS. The service request may identify one or more attributes to be shared with the device. The user's PDS may perform a counterparty check to confirm an identity of the device. The user's PDS may then ask the user to confirm that values of the one or more identified attributes may be shared with the device. Additionally, or alternatively, the user's PDS may prepare a badge with attestations of the one or more identified attributes, and may request that a trusted entity sign the badge. Once the badge is published to a distributed ledger and signed by the trusted entity, the user's PDS may share the values of the one or more identified attributes with the device, so that the device may use the values to perform one or more actions. For instance, a smart gateway may use its owner's attribute values to coordinate actions among end devices connected to the smart gateway. The inventors have recognized and appreciated that an attribute, such as a driver's license number or a passport number, may be valid for only a limited period of time. Accordingly, a PDS may set a validity period for an attestation (or a badge), for example, when sending a setAttribute transaction (or a createBadge transaction) to the corresponding DIR. An underlying distributed ledger implementation may determine when the validity period has expired, at which point a transaction may be sent to the DIR to invalidate the attestation (or the badge). In some embodiments, all entities that have subscribed to the DIR may be notified of this change in state.

Figure 13:
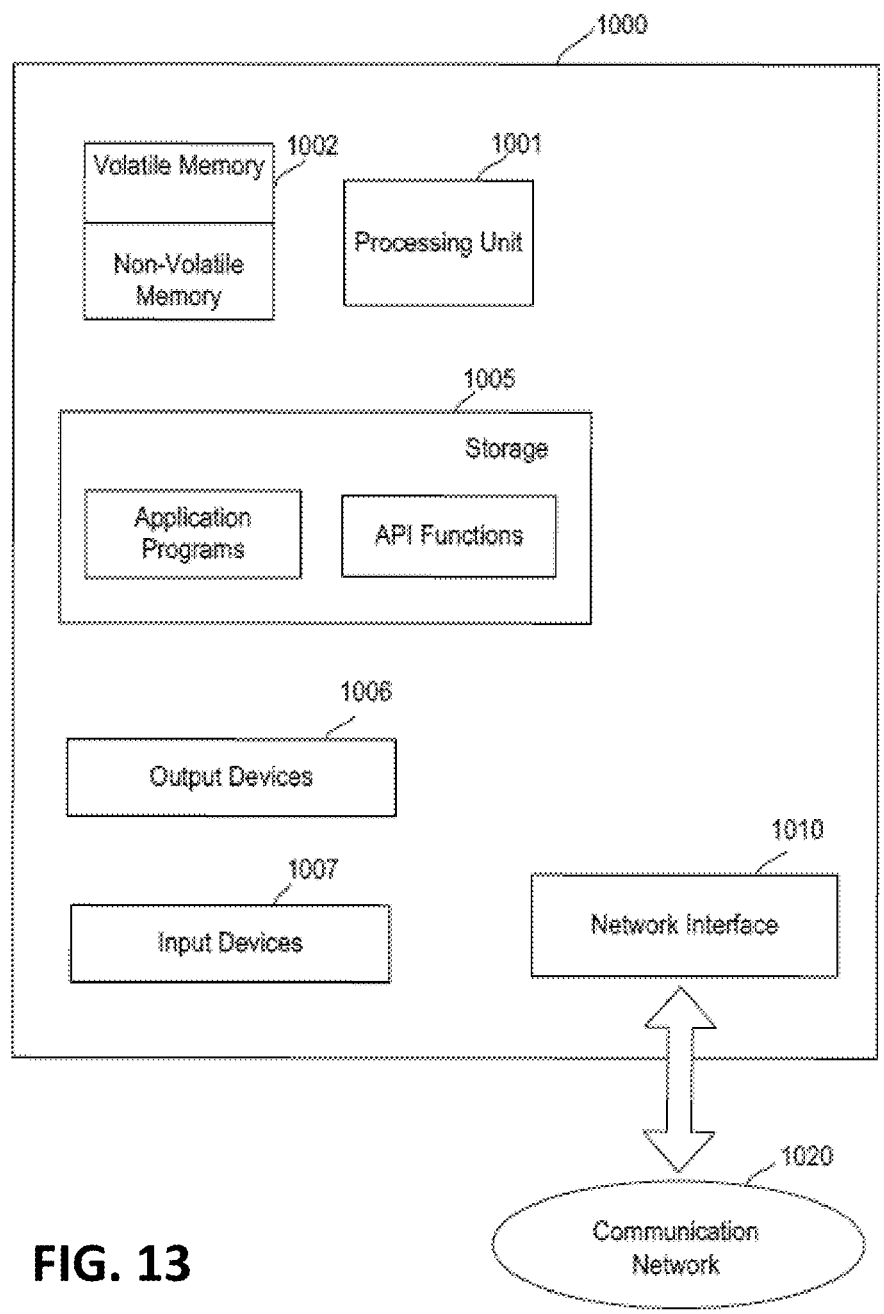
FIG. 13 shows, schematically, an illustrative computer 1000 on which any aspect of the present disclosure may be implemented.

FIG. 13 shows, schematically, an illustrative computer 1000 on which any aspect of the present disclosure may be implemented. In the embodiment shown in FIG. 13, the computer 1000 includes a processing unit 1001 having one or more computer hardware processors and one or more articles of manufacture that comprise non-transitory computer-readable storage media (e.g., system memory 1002) that may include, for example, volatile and/or non-volatile memory. The memory 1002 may store one or more instructions to program the processing unit 1001 to perform any of the functions described herein. The computer 1000 may also include other types of non-transitory computer-readable media, such as storage 1005 (e.g., one or more disk drives) in addition to the system memory 1002. The storage 1005 may also store one or more application programs and/or external components used by application programs (e.g., software libraries), which may be loaded into the memory 1002. To perform any of the functionality described herein, processing unit 1001 may execute one or more processor-executable instructions stored in the one or more non-transitory computer-readable storage media (e.g., memory 1002, storage 1005), which may serve as non-transitory computer-readable storage media storing processor-executable instructions for execution by the processing unit 1001.

The computer 1000 may have one or more input devices and/or output devices, such as devices 1006 and 1007 illustrated in FIG. 13. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 13, the computer 1000 may also comprise one or more network interfaces (e.g., the network interface 10010) to enable communication via various networks (e.g., the network 10020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The invention claimed is:

1. A computer-implemented method for performing access control for a first entity, comprising acts of:
   receiving an access request to access the first entity, wherein the first entity comprises an identifiable object or a physical space;
   identifying, based at least in part on the access request, a pointer associated with a second entity attempting to access the first entity;
   using the pointer associated with the second entity to access, from a distributed ledger system, at least one attestation for at least one attribute of the second entity, wherein the at least one attestation is movable between at least two states in the distributed ledger system, the at least two states comprising a state indicating that the at least one attribute of the second entity has been verified;
   determining whether the at least one attestation is in the state indicating that the at least one attribute of the second entity has been verified;
   determining whether to trust a third entity indicated as being responsible for verifying the at least one attribute of the second entity;
   determining whether a cryptographic proof in the at least one attestation is a valid proof of at least one value of the at least one attribute of the second entity, wherein the at least one value of the at least one attribute comprises at least one privilege label of the second entity;
   determining whether one or more access rules of the first entity are satisfied, at least in part by applying at least one access rule of the one or more access rules to the at least one privilege label of the second entity; and
   allowing the second entity to access the first entity in response to determining: (i) that the at least one attestation is in the state indicating that the at least one attribute of the second entity has been verified, (ii) that the third entity is to be trusted for verifying the at least one attribute of the second entity, (iii) that the cryptographic proof is a valid proof of the at least one privilege label of the second entity, and (iv) that the one or more access rules of the first entity are satisfied.

2. The computer-implemented method of claim 1, wherein:
   the at least one attestation is stored in a badge of the second entity, wherein the badge is stored in the distributed ledger system, and the pointer associated with the second entity is used to access the badge; and
   the third entity is indicated as being responsible for verifying the badge.

3. The computer-implemented method of claim 1, further comprising an act of:
   storing, in the distributed ledger system, a record of the second entity attempting to access the first entity, wherein the record of the second entity attempting to access the first entity comprises at least one piece of information selected from a group consisting of:
      information indicating whether the at least one attestation is in the state indicating that the at least one attribute of the second entity has been verified;
      information indicating whether the third entity is to be trusted for verifying the at least one attribute of the second entity;
      information indicating whether the cryptographic proof is a valid proof of the at least one privilege label; and
      information indicating whether the one or more access rules of the first entity are satisfied.

4. The computer-implemented method of claim 1, further comprising acts of:
   identifying, based at least in part, on the access request, an indication of one or more functionalities and/or pieces of data to which the second entity has requested access from the first entity; and
   identifying an access mode that allows the one or more functionalities and/or pieces of data to be accessed from the first entity, wherein the one or more access rules of the first entity are associated with the access mode.

5. The computer-implemented method of claim 1, wherein:
   the first entity comprises a physical space;
   the second entity comprises a natural person; and
   allowing the second entity to access the first entity comprises allowing the natural person to enter the physical space.

6. The computer-implemented method of claim 1, wherein:
   the first entity comprises a first device;
   the second entity comprises a second device; and
   allowing the second entity to access the first entity comprises allowing the second device to use a service provided by the first device.

7. The computer-implemented method of claim 6, wherein using the service provided by the first device comprises receiving data from, and/or sending data to, the first device.

8. The computer-implemented method of claim 1, wherein:
   the first entity comprises a first device;
   the second entity comprises a second device; and
   allowing the second entity to access the first entity comprises allowing the second device to make at least one change to the first device.

9. The computer-implemented method of claim 1, wherein:
   the at least one value of the at least one attribute comprises an identifier of a fourth entity; and storing the identifier of the fourth entity in the at least one attribute of the second entity indicates that the second entity bears a selected relationship with the fourth entity.

10. A system, comprising:
at least one computer processor; and
at least one non-transitory computer-readable medium having encoded thereon instructions which, when executed, cause the at least one computer processor to perform a method, the method comprising:
receiving an access request to access a first entity, wherein the first entity comprises an identifiable object or a physical space;
identifying, based at least in part on the access request, a pointer associated with a second entity attempting to access the first entity;
using the pointer associated with the second entity to access, from a distributed ledger system, at least one attestation for at least one attribute of the second entity, wherein the at least one attestation is movable between at least two states in the distributed ledger system, the at least two states comprising a state indicating that the at least one attribute of the second entity has been verified;
determining whether the at least one attestation is in the state indicating that the at least one attribute of the second entity has been verified;
determining whether to trust a third entity indicated as being responsible for verifying the at least one attribute of the second entity;
determining whether a cryptographic proof in the at least one attestation is a valid proof of at least one value of the at least one attribute of the second entity, wherein the at least one value of the at least one attribute comprises at least one privilege label of the second entity;
determining whether one or more access rules of the first entity are satisfied, at least in part by applying at least one access rule of the one or more access rules to the at least one privilege label of the second entity; and
allowing the second entity to access the first entity in response to determining: (i) that the at least one attestation is in the state indicating that the at least one attribute of the second entity has been verified, (ii) that the third entity is to be trusted for verifying the at least one attribute of the second entity, (iii) that the cryptographic proof is a valid proof of the at least one privilege label of the second entity, and (iv) that the one or more access rules of the first entity are satisfied.

11. The system of claim 10, wherein:
the at least one attestation is stored in a badge of the second entity, wherein the badge is stored in the distributed ledger system, and the pointer associated with the second entity is used to access the badge; and
the third entity is indicated as being responsible for verifying the badge.

12. The system of claim 10, wherein the method further comprises:
storing, in the distributed ledger system, a record of the second entity attempting to access the first entity, wherein the record of the second entity attempting to access the first entity comprises at least one piece of information selected from a group consisting of:
information indicating whether the at least one attestation is in the state indicating that the at least one attribute of the second entity has been verified;
information indicating whether the third entity is to be trusted for verifying the at least one attribute of the second entity;
information indicating whether the cryptographic proof is a valid proof of the at least one privilege label; and
information indicating whether the one or more access rules of the first entity are satisfied.

13. The system of claim 10, wherein the method further comprises:
identifying, based at least in part, on the access request, an indication of one or more functionalities and/or pieces of data to which the second entity has requested access from the first entity; and
identifying an access mode that allows the one or more functionalities and/or pieces of data to be accessed from the first entity, wherein the one or more access rules of the first entity are associated with the access mode.

14. The system of claim 10, wherein:
the first entity comprises a physical space;
the second entity comprises a natural person; and
allowing the second entity to access the first entity comprises allowing the natural person to enter the physical space.

15. The system of claim 10, wherein:
the first entity comprises a first device;
the second entity comprises a second device; and
allowing the second entity to access the first entity comprises allowing the second device to use a service provided by the first device.

16. The system of claim 15, wherein using the service provided by the first device comprises receiving data from, and/or sending data to, the first device.

17. The system of claim 10, wherein:
the first entity comprises a first device;
the second entity comprises a second device; and
allowing the second entity to access the first entity comprises allowing the second device to make at least one change to the first device.

18. The system of claim 10, wherein:
the at least one value of the at least one attribute comprises an identifier of a fourth entity; and
storing the identifier of the fourth entity in the at least one attribute of the second entity indicates that the second entity bears a selected relationship with the fourth entity.

19. At least one non-transitory computer-readable medium having encoded thereon instructions which, when executed by at least one computer processor, cause the at least one computer processor to perform a method, the method comprising:
receiving an access request to access a first entity, wherein the first entity comprises an identifiable object or a physical space;
identifying, based at least in part on the access request, a pointer associated with a second entity attempting to access the first entity;
using the pointer associated with the second entity to access, from a distributed ledger system, at least one attestation for at least one attribute of the second entity, wherein the at least one attestation is movable between at least two states in the distributed ledger system, the at least two states comprising a state indicating that the at least one attribute of the second entity has been verified;

determining whether the at least one attestation is in the state indicating that the at least one attribute of the second entity has been verified;

determining whether to trust a third entity indicated as being responsible for verifying the at least one attribute of the second entity;

determining whether a cryptographic proof in the at least one attestation is a valid proof of at least one value of the at least one attribute of the second entity, wherein the at least one value of the at least one attribute comprises at least one privilege label of the second entity;

determining whether one or more access rules of the first entity are satisfied, at least in part by applying at least one access rule of the one or more access rules to the at least one privilege label of the second entity; and allowing the second entity to access the first entity in response to determining: (i) that the at least one attestation is in the state indicating that the at least one attribute of the second entity has been verified, (ii) that the third entity is to be trusted for verifying the at least one attribute of the second entity, (iii) that the cryptographic proof is a valid proof of the at least one privilege label of the second entity, and (iv) that the one or more access rules of the first entity are satisfied.

20. The at least one non-transitory computer-readable medium of claim 19, wherein:
the at least one attestation is stored in a badge of the second entity, wherein the badge is stored in the distributed ledger system, and the pointer associated with the second entity is used to access the badge; and
the third entity is indicated as being responsible for verifying the badge.

21. The at least one non-transitory computer-readable medium of claim 19, wherein the method further comprises:
storing, in the distributed ledger system, a record of the second entity attempting to access the first entity, wherein the record of the second entity attempting to access the first entity comprises at least one piece of information selected from a group consisting of:
information indicating whether the at least one attestation is in the state indicating that the at least one attribute of the second entity has been verified;
information indicating whether the third entity is to be trusted for verifying the at least one attribute of the second entity;
information indicating whether the cryptographic proof is a valid proof of the at least one privilege label; and
information indicating whether the one or more access rules of the first entity are satisfied.

22. The at least one non-transitory computer-readable medium of claim 19, wherein the method further comprises:
identifying, based at least in part, on the access request, an indication of one or more functionalities and/or pieces of data to which the second entity has requested access from the first entity; and
identifying an access mode that allows the one or more functionalities and/or pieces of data to be accessed from the first entity, wherein the one or more access rules of the first entity are associated with the access mode.

23. The at least one non-transitory computer-readable medium of claim 19, wherein:
the first entity comprises a physical space;
the second entity comprises a natural person; and
allowing the second entity to access the first entity comprises allowing the natural person to enter the physical space.

24. The at least one non-transitory computer-readable medium of claim 19, wherein:
the first entity comprises a first device;
the second entity comprises a second device; and
allowing the second entity to access the first entity comprises allowing the second device to use a service provided by the first device.

25. The at least one non-transitory computer-readable medium of claim 24, wherein using the service provided by the first device comprises receiving data from, and/or sending data to, the first device.

26. The at least one non-transitory computer-readable medium of claim 19, wherein:
the first entity comprises a first device;
the second entity comprises a second device; and
allowing the second entity to access the first entity comprises allowing the second device to make at least one change to the first device.

27. The at least one non-transitory computer-readable medium of claim 19, wherein:
the at least one value of the at least one attribute comprises an identifier of a fourth entity; and
storing the identifier of the fourth entity in the at least one attribute of the second entity indicates that the second entity bears a selected relationship with the fourth entity.

* * * * *

UNITED STATES PATENT AND TRADEMARK OFFICE
CERTIFICATE OF CORRECTION

PATENT NO. : 10,454,927 B2
APPLICATION NO. : 16/364125
DATED : October 22, 2019
INVENTOR(S) : Alex Oberhauser et al.

It is certified that error appears in the above-identified patent and that said Letters Patent is hereby corrected as shown below:

On the Title Page

Under abstract "27 Claims, 13 Drawing Sheets" should read --24 Claims, 13 Drawing Sheets--.

In the Claims

Column 34, Line 9, Claim 3, is (Cancelled).

Columns 35-36, Lines 61-10, Claim 12, is (Cancelled).

Columns 37-38, Lines 37-4, Claim 21, is (Cancelled).

Signed and Sealed this
Twenty-ninth Day of December, 2020

Andrei Iancu
*Director of the United States Patent and Trademark Office*